United States Patent [19]
Sinner

[11] 3,876,871
[45] Apr. 8, 1975

[54] SELF-ADAPTING CONTROL ELEMENT
[75] Inventor: Edouard Sinner, Grenoble, France
[73] Assignee: Societe Generale de Constructions Electriques et Mecaniques (Alsthom), Paris, France
[22] Filed: Oct. 1, 1973
[21] Appl. No.: 402,422

[30] Foreign Application Priority Data
Sept. 29, 1972 France ............................. 72.34737

[52] U.S. Cl. ............................................ 235/150.1
[51] Int. Cl. ......................................... G05b 13/02
[58] Field of Search ...................... 235/150.1, 150.2

[56] References Cited
UNITED STATES PATENTS
3,435,422 3/1969 Gerhardt et al. ............ 235/150.1 X
3,463,908 8/1969 Connelly .......................... 235/150.1
3,795,799 3/1974 Courtiol .......................... 235/150.1

Primary Examiner—Eugene G. Botz
Attorney, Agent, or Firm—Craig & Antonelli

[57] ABSTRACT

Self-adapting control element which effects the controlling, in a closed loop, of processes having parameters which vary in a way which cannot be foreseen or measured, while maintaining unvarying performances, characterized in that it comprises a determining of the coefficients of the regulator (R) by a calculator (c) receiving a data item (5) concerning the required performances and the parameters (4) of an adjustable model and a determining, by that adjustable model, of the variables of state (7) entering the regulator (R).

19 Claims, 16 Drawing Figures

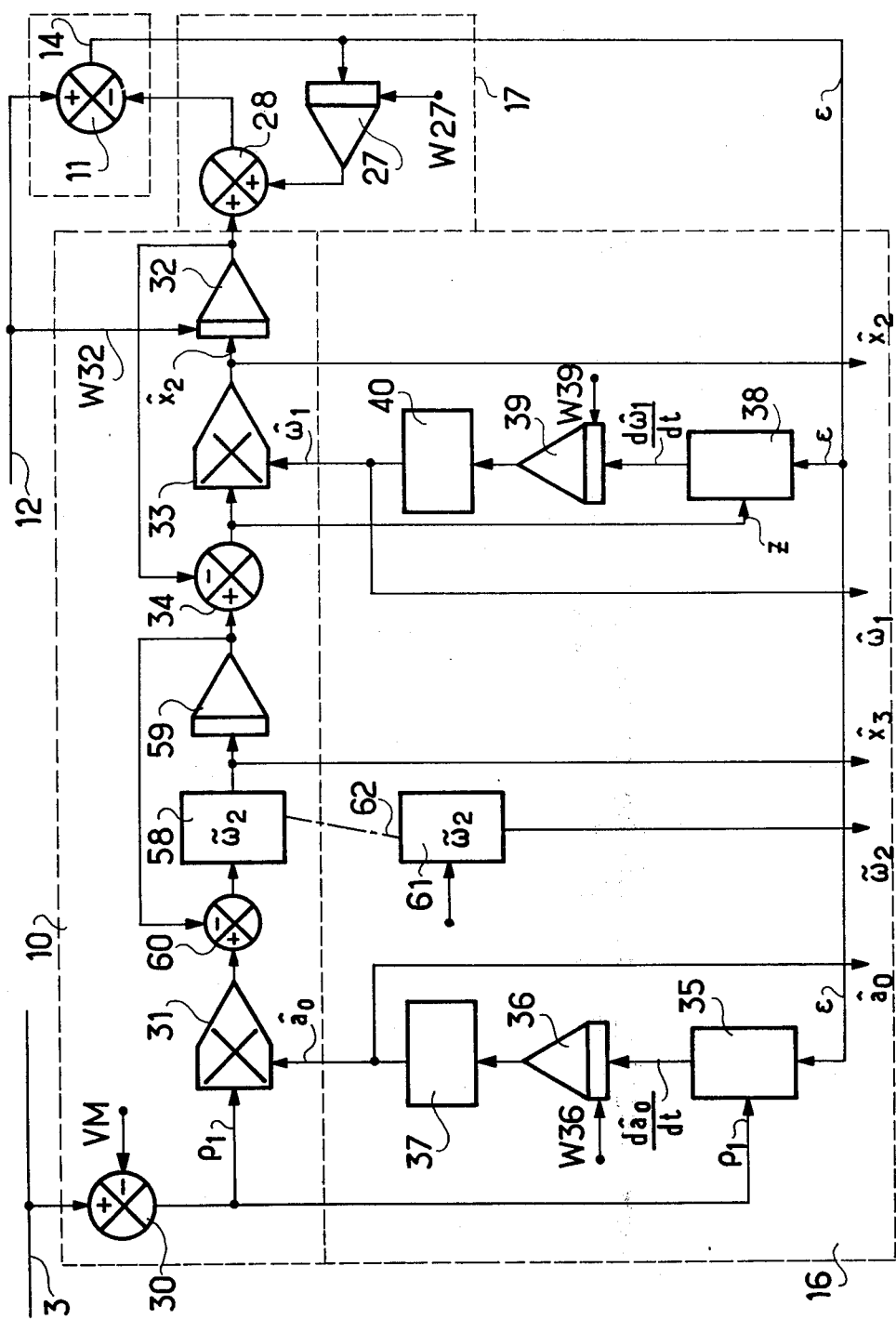

SELF-ADAPTING CONTROL ELEMENT

The invention concerns an adaptive regulator for effecting closed loop controlling of processes whose dynamic parameters vary in an unforeseen way and/or are not measurable during operation, or whose dynamic parameters are unknown or difficult to determine.

Processes having parameters which are variable in time are found in numerous branches.

In aeronautics, parameters such as gain, clamping, proper frequency...etc., come into play in the various transfer functions which describe the dynamic reaction of an aircraft, vary with the altitude and the speed of the latter. The thrust of a jet engine varies with the fuel output, the speed of the aircraft, the degree of humidity of the air, the mechanical condition of the jet engine, etc.

In the navy the parameters coming into play in the transfer function which links the course of a ship to the deflection of the rudder vary with the speed, the mass and the moment of inertia of the ship and with the propulsion force of the propellers.

In electrotechnics, the dynamic reaction of a direct current engine varies with the inertia and friction transferred to the engine shaft, which may vary greatly with the load driven. This is more particularly the case with engines used for electrical traction and drive engines for rolling mills. The dynamic reaction of an asynchronous engine with a squirrel cage rotor depends, moreover, on the variable amplitude and the frequency of the voltage applied to the engine. In drive systems for lifts, freight elevators and telepherics, the dynamic reaction of the process varies greatly with the load transported.

In chemical and thermal processes, the various transfers which describe the dynamic reaction of these systems vary generally with the operation point. It is often very difficult to known beforehand by calculation the parameters which characterize these transfers (examples: distilling columns, heat exchangers, boilers, etc.).

It is known that, to be able to produce a regulating system or servo-system in a closed loop which has satisfactory performance, the structure and the parameters of the process to be regulated or servo-controlled must be known. "Structure" means the structure of the mathematical model which is used for describing the class of dynamic reactions to which the process belongs (for example, the dynamic reaction of the process may be described by a differential linear equation or a transfer function of the first order with two parameters, the "gain" and the "time constant"; or else by an equation with partial derivatives; or else by a linear or nonlinear differential equation of the second order having differences, etc.). "Parameter" means the coefficients which come into play in the mathematical relations used to describe the dynamic reaction of the process. With that data, in one phase, the type of regulator which is best suited to the type of process to be controlled is chosen (for example, regulator P having a proportional action; or else, regulator PI having proportional and integral actions; or else, regulator PID having proportional, integral and derived actions) and in a second phase, the parameters of the regulator are adjusted (for example, the coefficients of proportional, integral, or derivative actions) so that the "process+regulator" combination in a closed loop has satisfactory performance with respect to certain requirements, for example, stationary error zero, response and exceeding time less than an imposed limit, etc.

Now, if the parameters of the process vary in time as in the case of the previously listed processes and if a conventional regulator with fixed adjustments is used, the performance of the closed loop becomes degraded as the difference between the true parameters of the process and the parameters of the process for which the regulator had been adjusted increases. It would therefore be necessary to readjust the coefficients of the regulator as a function of the new values of the parameters of the process to avoid that deterioration of the performance of the regulating loop or servo-control loop.

In certain applications the way of carrying out the readjusting automatically is known if the relation between the variations of the parameters of the process and the factors which cause these variations are known beforehand. It is then sufficient to measure these factors, to deduce therefrom, by means of an equation or of a table, the values of the parameters of the process, to determine the value of the readjustments necessary for the regulator and to effect those readjustments automatically. Thus, it has been seen that the parameters-gain, damping, proper frequency coming into play in the various transfer functions which describe the dynamic reaction of an aircraft vary with the altitude and the speed of the latter. If the variation law is known, it is sufficient to measure, by means of suitable sensors, the altitude and the speed, to deduce therefrom, by means of an automatic calculating device, the parameters-gain, damping and proper frequency of the aircraft and to readjust, from this calculated data, the coefficients of the automatic pilot.

A monitoring of the parameters of the regulator is thus effected starting from the measurement of certain magnitudes characterizing the operation of the process, but the implementing of that solution requires a great knowledge beforehand of the process to be controlled. It is defective as soon as the parameters of the process vary in an unforeseen way which cannot be measured, directly or indirectly. Such regulators are therefore not self-adpating, inasmuch as they are that capable of adjusting their own coefficients themselves during operation. They need outside data concerning the dynamic parameters of the process.

The present invention aims at effecting the controlling in a closed loop of processes whose dynamic parameters vary in an unforeseen way which cannot be measured during operation, while maintaining the dynamic performance of the closed loop which do not vary despite the variations of the dynamic parameters of the process.

For that purpose, it provides a self-adapting control element for processes whose parameters are unknown or variable, comprising a regulator for variables of states having adjustable coefficients, which receives an input value and variables representative of the state of the process and supplies an action signal for the process, characterized in that it comprises a subassembly for the identification of the parameters and for observing the variable of states of the process, constituted by a model having adjustable parameters, placed parallel to the process and by an adapting mechanism modifying the parameters of the model until the difference between the outputs of the process and the model be minimum and a subassembly for calculating the coefficients of the regulator, which receives the parameters of the model and data on the required performance and determines the coefficients of the regulator, whereas the variables which are representative of the state of the process, received by the regulator, are, besides the output of the process, variables of state sampled at the model.

That self-adapting control element does not require the previous knowledge of the laws of variation of the parameters of the process. It uses exclusively the input and output signals of the process to be controlled and, starting from that data, it calculates the values of the parameters of the regulator which are necessary for maintaining the performances of the closed loop invariable despite the great variations in the parameters of the process.

That self-adapting control element may also bring about a gain in performance and in time in all cases where it is difficult to obtain beforehand a sufficiently exact knowledge of the dynamic parameters of the process, in order to be able to effect an adjustment of the regulator which guarantees good performance of the closed loop when an installation is put into service. By way of example, complex chemical and thermal systems the theoretical and experimental examination of which is generally difficult, may be quoted. In these conditions, the adjusting of the regulators of all the loops may require a great deal of time, until they are all properly adjusted. In this case, the use of self-adapting control elements ensures an automatic adjusting of the coefficients of the regulators to the unknown parameters of each regulating loop. The result thereof is an improvement in dynamic performance, as well as a gain in time and labor.

Once the self-adapting control element has adjusted its coefficients as a function of the unknown parameters of the process which it controls, the value of these coefficients may be measured and the value of the parameters of the process may be deduced therefrom. That self-adapting control element therefore has also applications in the branch of identification in true time of closed loop processes.

With reference to the accompanying diagrammatic figures, the implementing of the invention will be described in a general way, then in particular cases where the adjustable model is respectively of the first order, of the first order with a pure delay and of the second order.

FIGS. 6, 7, 8, and 9 relate to the case of an adjustable model of the first order and show, respectively, the regulator, the identification subassembly, the calculation subassembly, and the general embodiment of a self-adapting control element.

Figure 10:
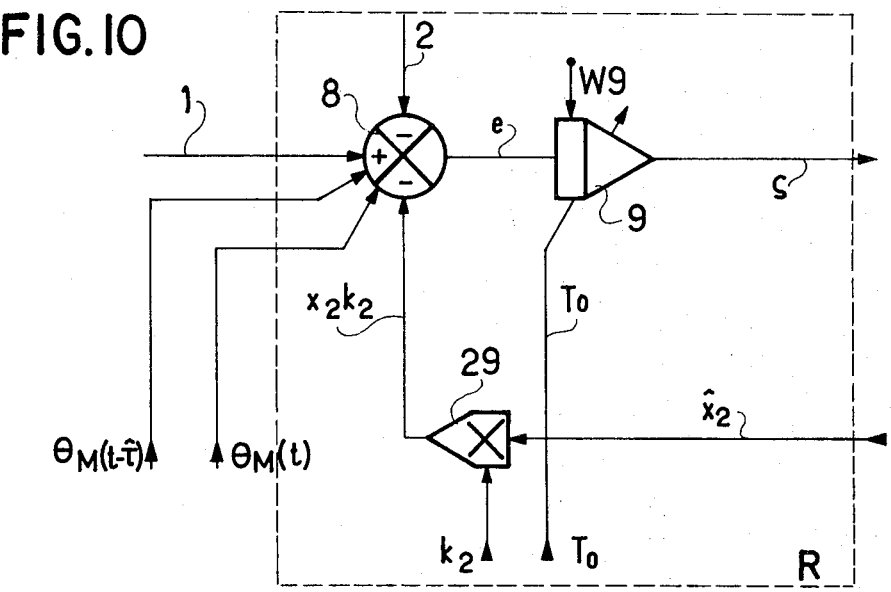
Figure 11:
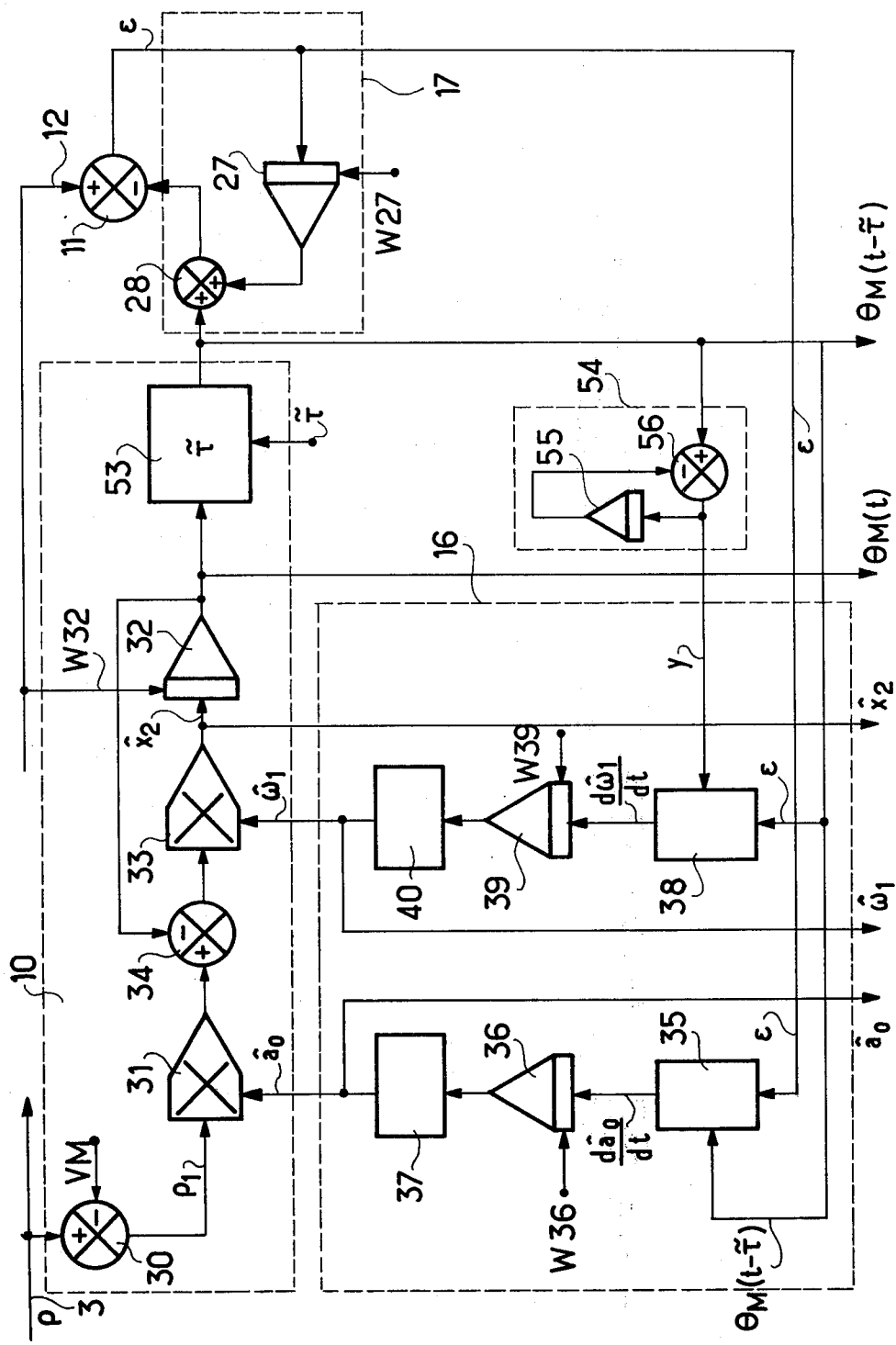
Figure 12:
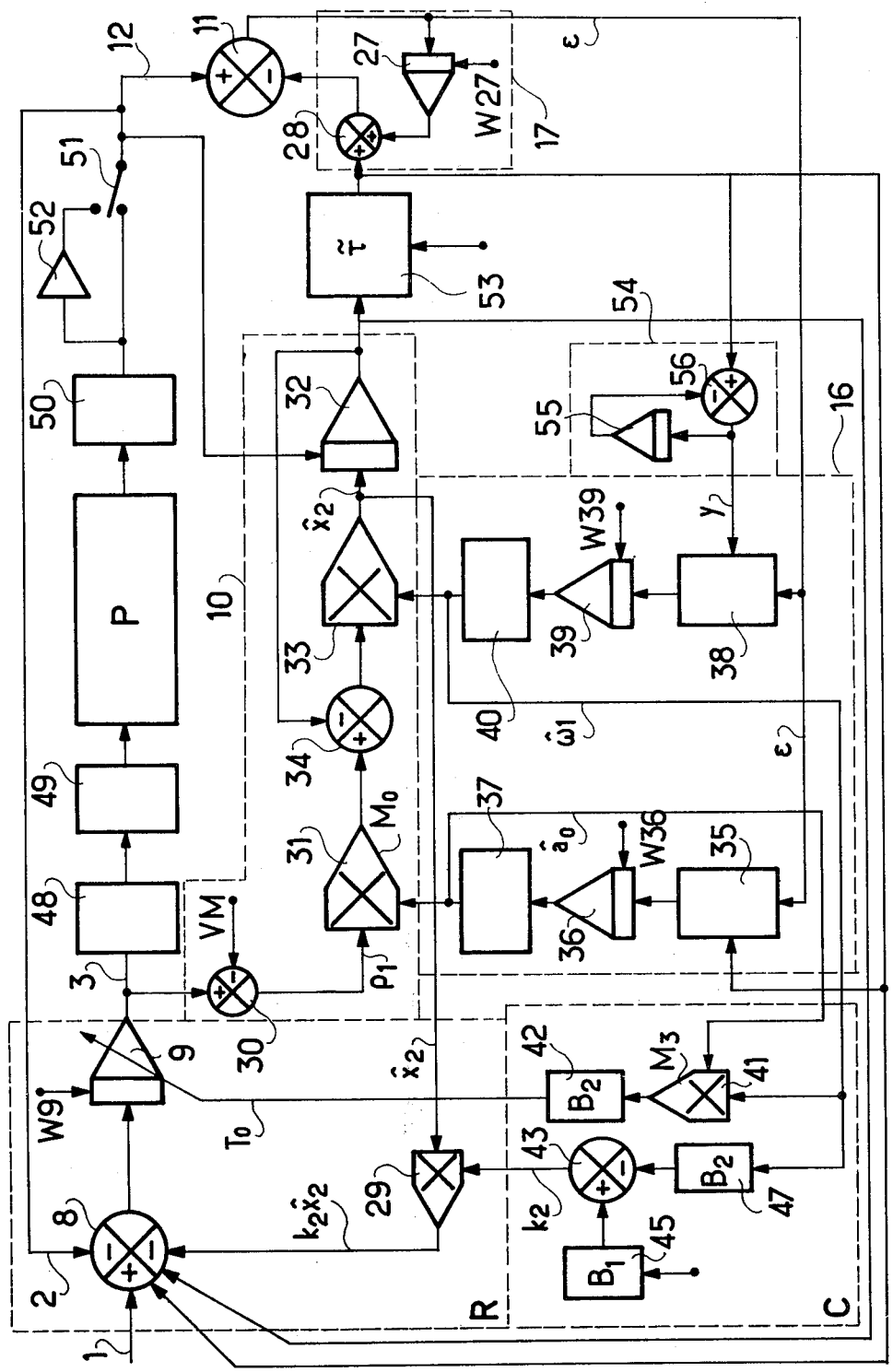

FIGS. 10, 11, and 12 relate to the case of an adjustable model of the first order with a pure delay and show respectively, the regulator, the identification subassembly and the general embodiment of a self-adapting control element.

FIGS. 13, 14, 15, and 16 relate to the case of an adjustable model of the second order and show, respectively, the regulator, the identification subassembly, the calculation subassembly and the general embodiment of a self-adapting control element.

Figure 1:
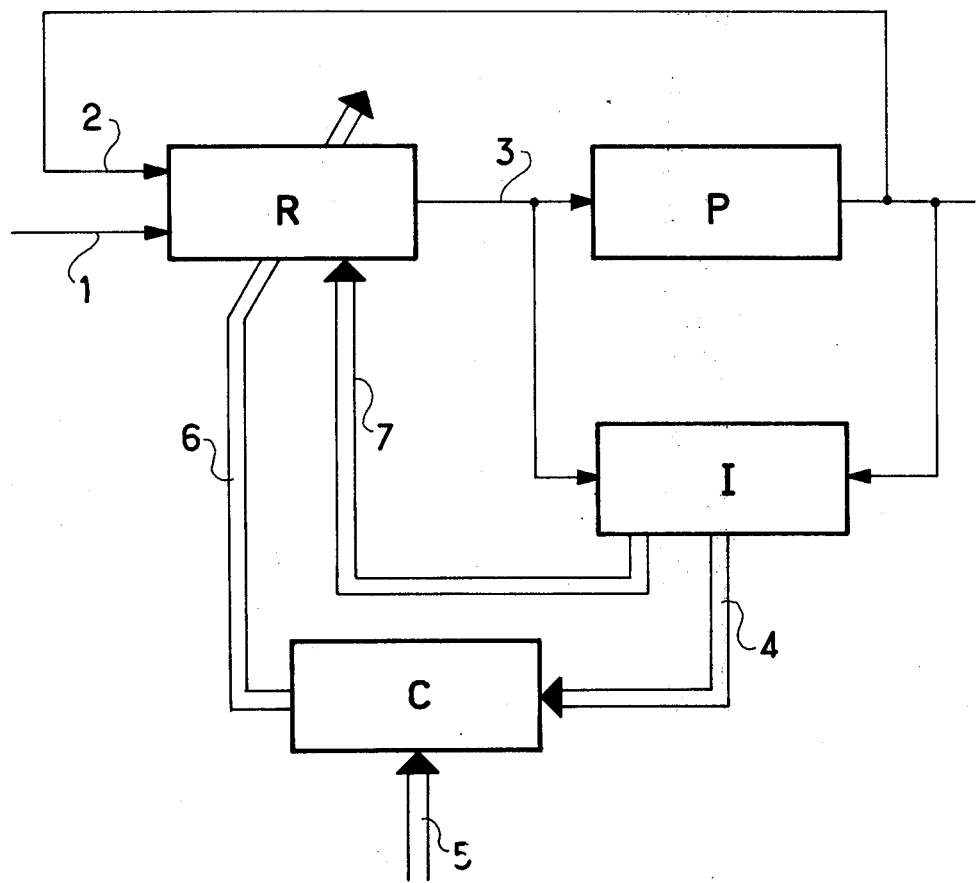
FIG. 1 shows the general diagram of a self-adapting control element.
Figure 2:
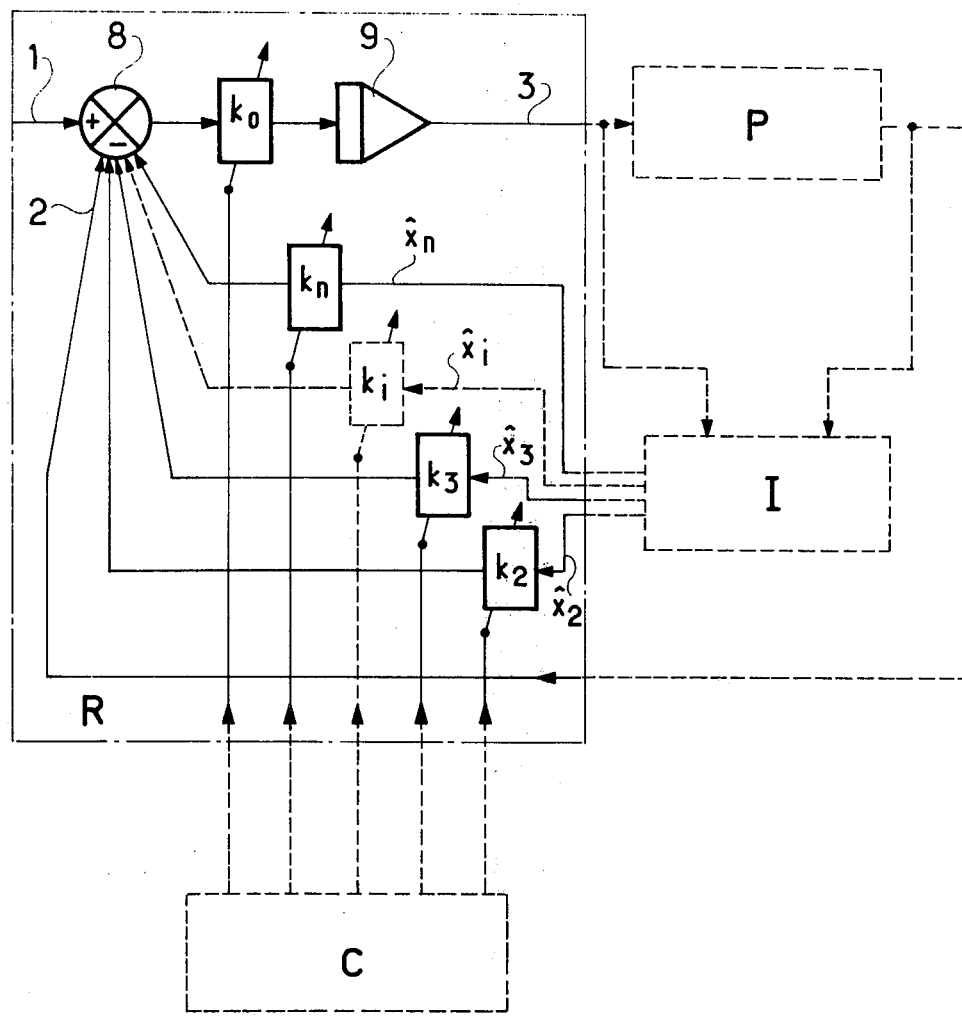
FIG. 2 shows the regulator of that element as well as its connections with the other subassemblies.

The general diagram of the self-adapting control element is shown in FIG. 2. That element consists essentially of three subassemblies:
- a "regulator" subassembly referenced R;
- an "identification" subassembly referenced I and connected up in parallel with a process P;
- a "regulator coefficients calculation" subassembly referenced C.

The process P is controlled by the "regulator" subassembly R. This latter calculates starting from an input 1 and from the output signal 2 of the process (also called "measurement"), an action signal 3 such that the performance of the closed loop be satisfactory. For that purpose the coefficients of the "regulator" subassembly R are adjusted by the "regulator coefficients calculation" subassembly C, as a function of data on the dynamic reaction of the process, supplied by 4 by the "identification" subassembly I and the required performances in a closed loop, brought in at 5.

The calculation subassembly C sends out, at 6, signals for the adjusting of the regulator coefficients R and the latter receives at 7, from the subassembly I, variables which are representative of the state of the process, estimated by that subassembly I.

All the operations shown above are effected in real time; if the dynamic parameters of the process vary during time, the "identification" subassembly detects that variation. The "regulator coefficients calculation" subassembly determines, consequently, the new values to be given to the coefficients of the regulator. With these new values and the variables of state of the process supplied by the "identification" subassembly, the "regulator" subassembly calculates an action signal such that the dynamic performance of the closed loop practically does not vary.

The subassembly R, which is shown in greater detail in FIG. 2, has the function of calculating the magnitude of action 3 which is applied to the input of the process P, starting from the following magnitudes. The input 1 (also called reference), the measurement 2 (process output) and other data on the dynamic reaction of the process which reach it from the subsystems I and C. This data will be, on the one hand, estimated "variable of state" $\hat{x}_2$ to $\hat{x}_n$ (coming from the "identification" subassembly I) and on the other hand, the "coefficients of the regulator" $k_0$ and $k_2$ to $k_n$ (coming from the "regulator coefficients calculation" subassembly C).

The regulator used is based on "linear control by reaction of state". The control law most generally calculated by the "regulator" subassembly R has the form:

$$\text{action} = k_0 (R - k_1 x_1 - k_2 x_2 \ldots - k_i x_i - \ldots - k_n x_n) \tag{equ. 1}$$

That is, the action is a linear combination of the input R and of $n$ variables $x_1, x_2, \ldots x_i \ldots x_n$ called "variables of state".

To ensure a zero stationary error in the closed loop in permanent state, the following must be so:
$k_1 = 1$ so that the equation becomes:

$$\text{action} = k_0 (R - x_1 - k_2 x_2 - \ldots - k_i x_i - \ldots - k_n x_n) \tag{equ. 2}$$

The coefficients $k_o, k_2 \ldots k_n$ are given by multipliers and the above subtraction is carried out in a subtractor 8.

If the process does not have any proper integration, an integrator 9 must be added in the regulating loop, so that equation 2 becomes;

$$\text{action} = k_0 \int_0^t (R\ x1 - k2\ x2 - \ldots - ki\ xi - \ldots - kn\ xn\ )(\text{equ. 3}).$$

The coefficients of the "regulator" subassembly R are the coefficients $k_o, k_2, \ldots k_i \ldots k_n$. They are adjusted automatically so that the performance of the closed loop be satisfactory, due to the "regulator coefficients calculation" subassembly C.

The variables of state $x_1, x_2, \ldots x_i, \ldots x_n$, are variables which describe completely the process to be controlled. They form an assembly of $n$ numbers such that the knowledge of these n variables of state of the process at a given instant $t_0$ and of the input of that process for all instants $t \geq t_0$ is sufficient for determining the development of the process at all instants $t \geq t_0$.

In the self-adapting control element, it is presumed that only the first variable of state $x_1$ of the process is directly measurable (physically, it may represent the output magnitude $\theta_p$ of the process, also called measurement) instead of the real variables of state of higher order: $x_2, \ldots x_i, \ldots x_n$, the estimated variables of state $\hat{x}_2, \hat{x}_3, \ldots \hat{x}_i, \ldots \hat{x}_n$ supplied by the identification subassembly are used.

Figure 3:
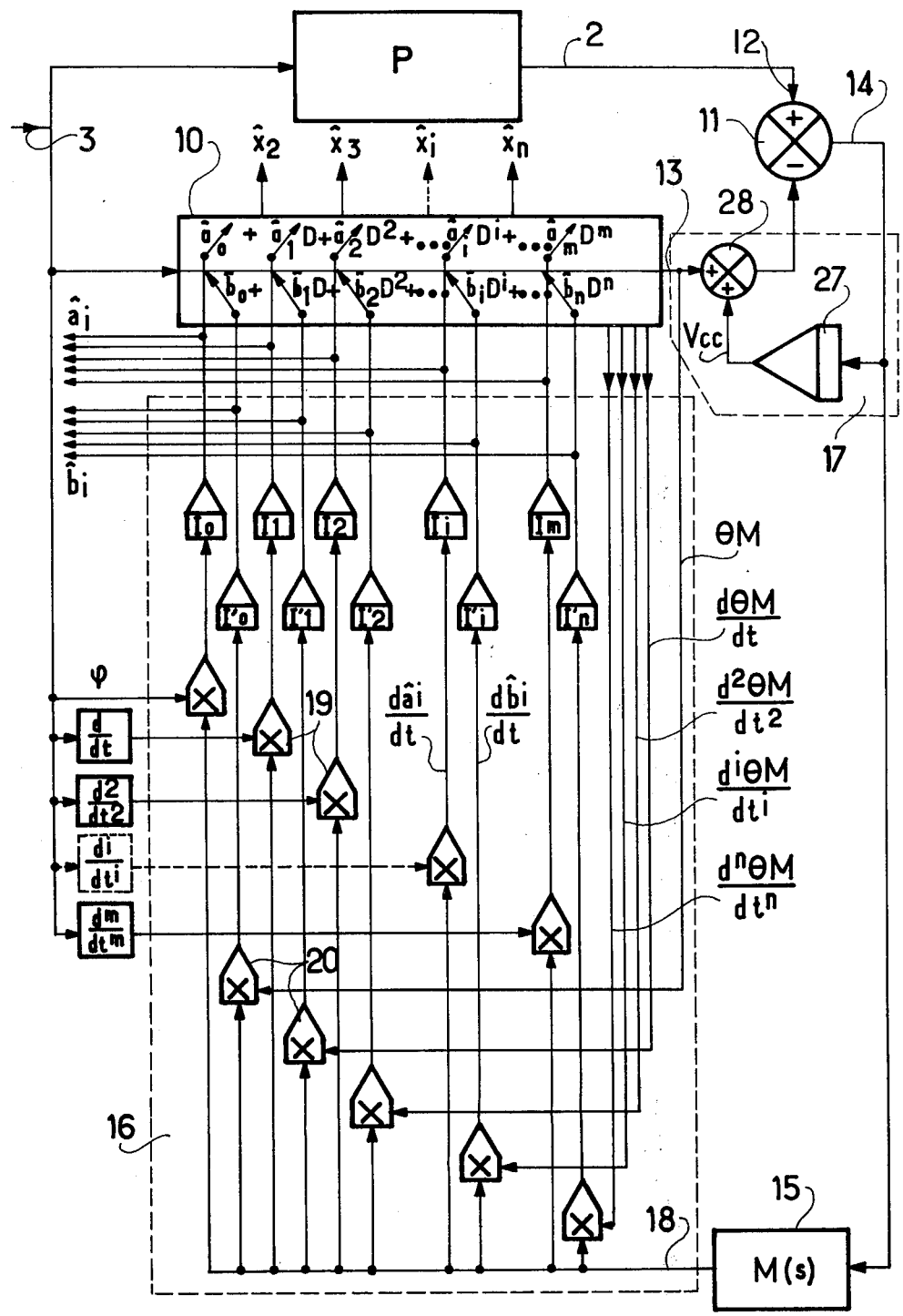
FIG. 3 shows the identification subassembly.

The "identification" subassembly, shown in greater detail in FIG. 3, has the function of determining, in real time, an estimation of the dynamic parameters and an estimation of the variables of state which characterize, at a given instant, the dynamic reaction of the process to be controlled.

That subassembly is based on the principle of identification by adjustable model and is composed of four parts: a model 10 having adjustable parameters (which will be called, more simply "adjustable model"), which is generally a simplified representation of the transfer function of the process to be identified; a comparator 11, which compares the output 2 of the process received at 12 with the output 13 of the adjustable model and which supplies a signal 14 proportional to the difference $\epsilon$ between these two outputs; an adapting mechanism which modifies the adjustable parameters of the adjustable model until the difference between the outputs of the process and of the model be minimum, that adapting mechanism itself being composed of two main parts: a linear processing block 15 and a nonlinear calculating block 16; a compensation circuit 17 for the continuous component which is present at the output of the process and/or of the model.

The identification subassembly I provides two types of data to the other subassembly of the self-adapting control element: an estimate of the parameters of the process, the parameters $\hat{a}_i$ and $\hat{b}_i$ of the process (for example, gain, time constant, damping, proper frequency, etc.) are estimated by that subsystem; they are available at the output of integrators $I_0, I_1, \ldots I_i, \ldots$ Im and $I'_0, I'_1 \ldots I'_i \ldots I'_n$ and are sent towards the regulator parameter claculation subassembly C; an estimate of the variables of state of the process, the variables of state of the process are also estimated by that subassembly; the variables of state estimated, $\hat{x}_2, \hat{x}_3, \ldots \hat{x}_i, \ldots \hat{x}_n$ are available at various points of the model 10 and are sent towards the regulating subassembly R.

The parameters of the process may be unknown previously, or may vary under the effect of the outside environment (for example, a modification in altitude or in speed of an aircraft makes the gain, the damping and the proper frequency of the latter vary; or else, the change in the operation point of a distilling column or of a heat exchanger makes the gain, the time constants and the pure delays which come into play in the various transfers linking the input and output magnitudes of those units.) An attempt is made to follow these variations in real time by adjusting the parameters $\hat{a}_i$ and $\hat{b}_i$ of the adjustable model in such a way that the output of the model be at all times as near as possible to the output of the process.

The adjustable model may be described by an integrodifferential relation of the following type between the input $\rho$ of the model and the output $\theta$ M of the model: $(\hat{a}0 + \hat{a}1\ D + \ldots + \hat{a}nD^m)\rho = (\hat{b}0 + \hat{b}1\ D + \ldots + \hat{b}n\ D^n)\ \Theta\ M$ (equ. 4)

Where $D = d/dt$ is the differential operator in the distributive direction.

The adjustable parameters $\hat{a}_i$ and $\hat{b}_i$ of the model are monitored through integrators $I_i$ and $I'_i$ by the adapting mechanism. the practical effecting of that monitoring depends on the structure of the adjustable model and on its technological embodiment.

Often a simplified representation of the transfer function of the process to be identified will be adopted as the adjustable model (for example, a well-known approximation is the representation of a process of a high order by a model of the first order with a pure delay). The approximation of a process by a model of lower order has the advantage of a simplification of the structure of the adjustable model and of a simplification of the adapting mechanism.

The linear process block 15 receives the signal $\epsilon$, obtained at 14, indicating the difference between the output $\Theta$ P of the process and the output $\theta$ M of the model, calculated by the comparator 11; it provides at the output 18, a signal $v$:

$$v = M(s)\ \epsilon$$

(equ. 5)

where $\theta M(s) = C_0 + C_1 s + C_2 s^2 + \ldots + C_i s^i + \ldots + C_h s^h$ (equ. 6)

The transfer function $M(s)$ of that linear block must be chosen in such a way that the following transfer function:

$$Z(s) = \frac{C_0 + C_1 s + C_2 s^2 + \ldots + C_i s^i + \ldots + C_h s^h}{b_0 + b_1 s + b_2 s2 + \ldots b_i si + \ldots b_n sn}$$

(equ. 7)

have a strictly positive real part:

$$Re\ Z(s) > o$$

(equ. 8)

The nonlinear calculating block 16 contains multiplication circuits, such as 19 and 20, which produce the signals referenced $d\hat{a}_i/dt$ and $d\hat{b}_i/dt$ at the inputs of the integrators $I_i$ and $I'_i$ monitoring the adjustable parameters $\hat{a}i$ and $\hat{b}i$ of the model:

$$\frac{d\hat{a}_i}{dt} = \lambda i \cdot \frac{d^i\rho}{dt^i} \cdot v\ ;\ i = 0, 1, 2, \ldots m$$

(equ. 9)

$$\frac{d\hat{b}_i}{dt} = \mu_i \frac{d^i \theta M}{dt^i} \cdot \nu \; ; i = 0, 1, 2, \ldots n \quad \text{(equ. 10)}$$

where $\lambda_i$ and $_i$ are positive or negative constants. Physically, these constants represent gains of the adapting loops of the model, which may be distributed among several distinct physical elements in a given embodiment.

The magnitudes $d^i\theta M/dt^i$ are the derivatives of order $i$ of the output of the adjustable model, accessible, at certain points of the latter if the mathematical representation of the adjustable model is well chosen. They represent the variables of state $\hat{x}_i$ of the adjustable model; they will be called "estimated variables of state" because they constitute an estimate of the real variables of state of the process which are inaccessible or cannot be measured. They are used by the regulating subassembly for calculating the magnitude of action 3 which controls the process in a closed loop. The magnitude $d^ip/dt$ are the derivatives of order i of the action signal 3.

The laws for the adjustment of the parameters $\hat{a}_i$ and $\hat{b}_i$, given by the equations 9 and 10 may be given as follows:

$$\frac{d\hat{a}_i}{dt} = \lambda_i \frac{d_i \rho}{dt^i} \text{Sgn}^J (\nu) \; ; i = 0, 1, 2, \ldots m \quad \text{(equ. 11)}$$

$$\frac{d\hat{b}_i}{dt} = \mu_i \frac{d^i \Theta M}{dt^i} \text{Sgn}^J (\nu) \; ; i = 0, 1, 2, \ldots n \quad \text{(equ. 12)}$$

or else:

$$\frac{d\hat{a}_i}{dt} = \lambda_i \text{Sgn}^J \frac{d^i \rho}{dt^i} \cdot \nu \; ; i = 0, 1, 2, \ldots m \quad \text{(equ. 13)}$$

$$\frac{d\hat{b}_i}{dt} = -\mu_i \text{Sgn}^J \frac{d^i \Theta M}{dt^i} \cdot \nu \; ; i = 0, 1, 2, \ldots n \quad \text{(equ. 14)}$$

or else:

$$\frac{d\hat{a}_i}{dt} = \lambda_i \text{Sgn}^J \frac{d^i \rho}{dt} \text{Sgn}^J (\nu) \; ; i = 0, 1, 2, \ldots m \quad \text{(equ. 15)}$$

$$\frac{d\hat{b}_i}{dt} = -\mu_i \text{Sgn}^J \frac{d^i \Theta M}{dt^i} \text{Sgn}^J (\nu) \; ; i = 0, 1, 2, \ldots n \quad \text{(equ. 16)}$$

The function $\text{Sgn}^J$ which comes into play in equations 11 to 16 is defined by the following table:

| x | Sgn (x) |
|---|---|
| $x < -\delta$ | $-1$ |
| $-\delta \leq x \leq \delta$ | $0$ |
| $x > +\delta$ | $+1$ | where $\delta$ is a small quantity which may even be zero.

Instead of using, in the block 15, exact derivation operations which are always very difficult to carry out in practice, approximate derivatives ("filtered" derivatives) may be used; M (s) then has the form:

$$M(s) = \frac{C_0 + C_1 s + C_2 s^2 + \ldots + C_i s^i + \ldots C_h s^h}{d_0 + d_1 s + d_2 s^2 + \ldots + d_i s^i \, dk^{sk}} \quad k \geq h \quad \text{(equ. 17)}$$

The technique is simple and ensures acceptable operation of the identification subassembly 1 as long as $h \leq 2$.

Figure 4:
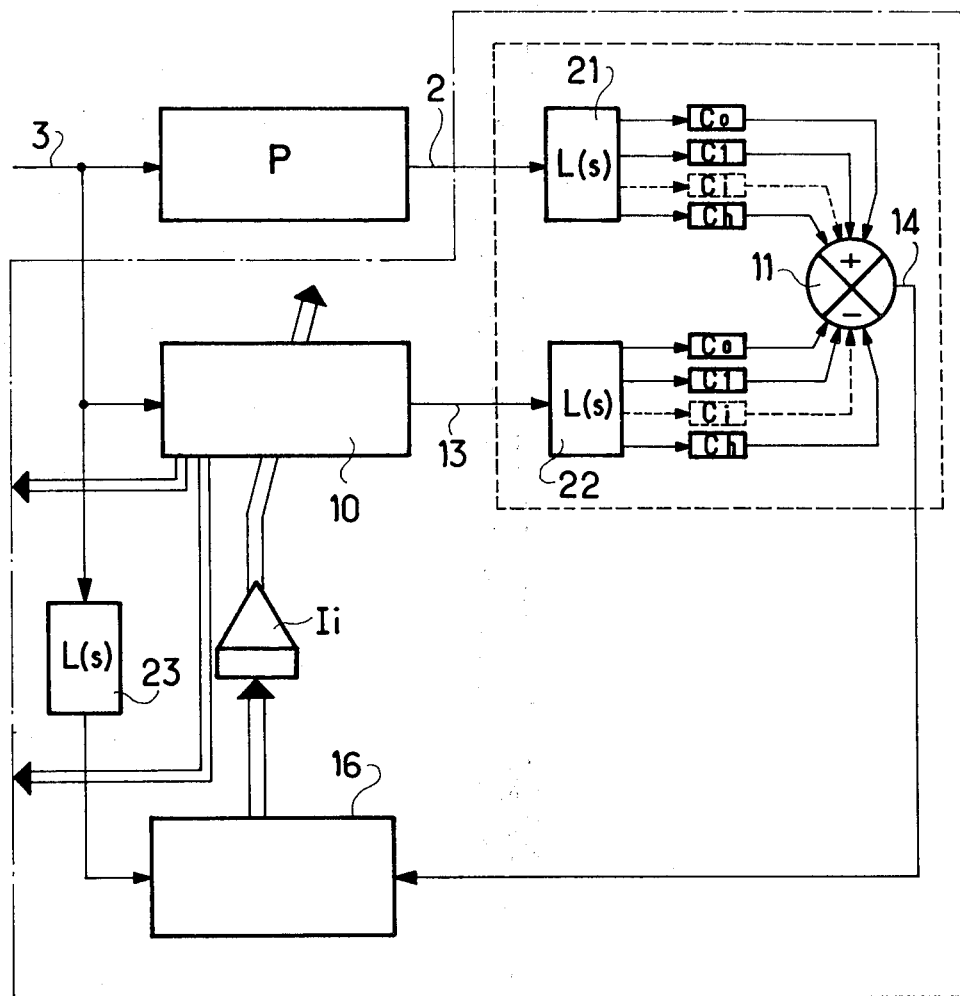
FIG. 4 shows the use of low-pass derivating filters in that subassembly.

Another solution to bypass exact derivation operations is the inserting of the low-pass derivating filters 21 and 22 between the outputs 2 and 13 of the process and of the model and the comparator 11, as well as a low-pass derivating filter 23 between the action signal 3 and the block 16, as shown in FIG. 4. The transfer function of those filters has been reference by L(s).

Figure 5:
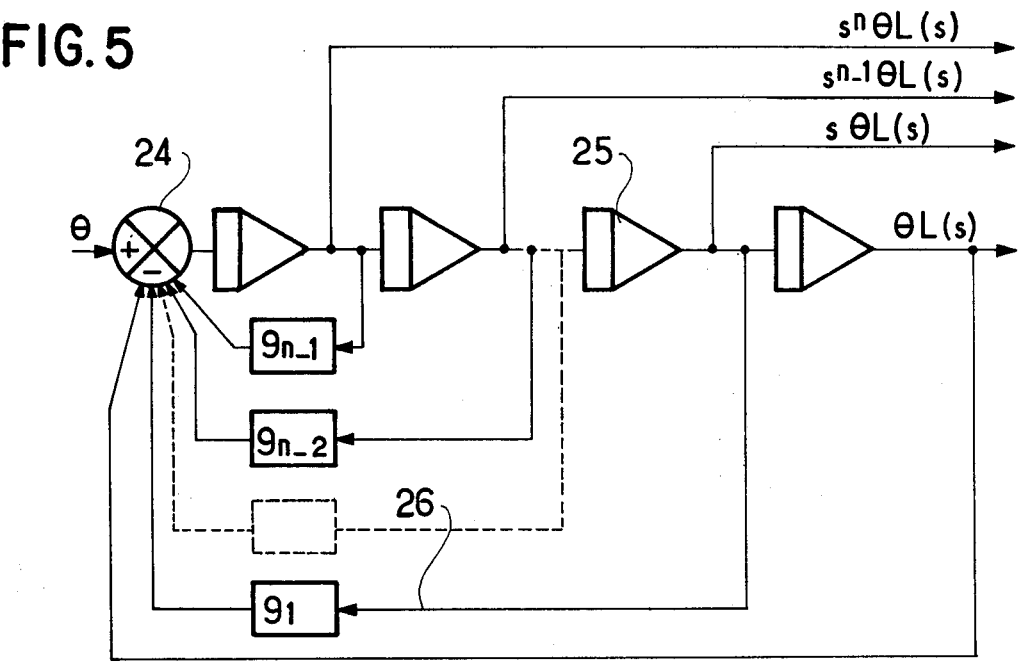
FIG. 5 shows a possible embodiment of such low pass derivation filters.
Figure 6:
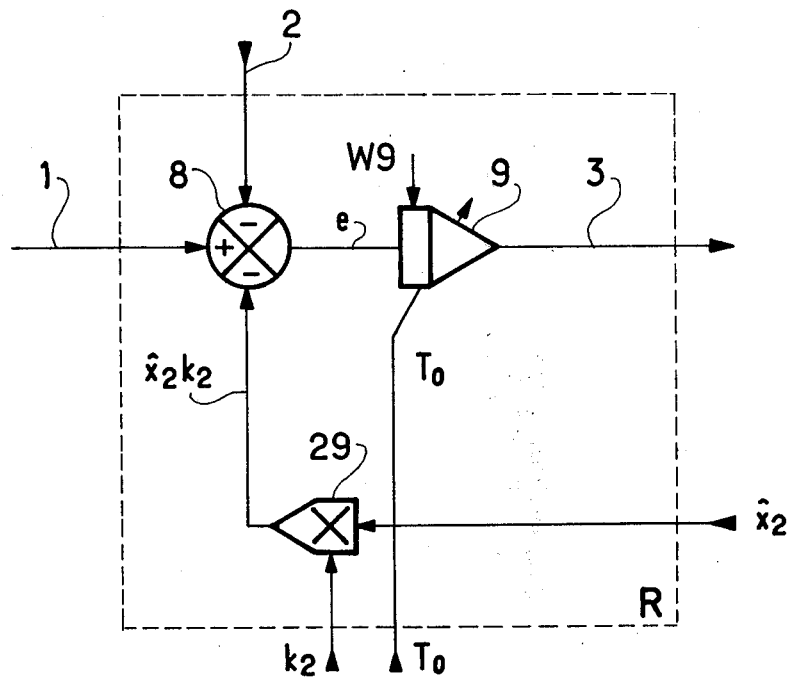

FIG. 5 shows an embodiment of such low-pass derivating filters. The filter consists of a subtractor 24 receiving data $\theta$ at its positive input and of a sequence of n integrators 25 in series, whose outputs are returned through connections 26 to the negative input of the substractor 24 with gains referenced $g_1$ to $g_n^{-1}$. The outputs of the various integrators 25 give the signals which may be used as approximate derivatives of the input signal $\theta$.

The compensation circuit 17 of the continuous component has the function of ridding the difference coming from the comparator 11 of the non-zero average value which may result from the fact that the output signals of the process ($\theta$ p) and the of model ($\theta_M$) have different continuous components. That circuit constitutes a low-pass filter of the first order, having a great time constant and it is composed of an integrator 27 and of an adder 28. It calculates the average value of the difference signal, reference Vcc, which is obtained at the output of the integrator 27 and is added in the adder 28 at the output of the model so that the output of the comparator 11 be at a zero average value.

The "regulator coefficients calculation" assembly C has the function of calculating the value of the adjustable coefficients $k_0, k_2, k_3, \ldots k_i, \ldots k_n$ provided at 6 at the regulator assembly R starting from: the parameters $\hat{a}_0, \hat{a}_1, \ldots \hat{a}_i, \ldots \hat{a}_m; \hat{b}_0, \hat{b}_1, \hat{b}_i, \ldots \hat{b}_n$ which are supplied to it at 4 by the identification subassembly I and data on the dynamic reaction which it is required to confer on the closed loop, this data being given at 5 in the form of a series of coefficient: $A_0, A_1, \ldots A_i, \ldots A_m$ and $B_0, B_1, \ldots B_i, B_n$.

In the general case, the structure of that subassembly C is very complex and cannot be shown easily in the form of a block diagram. The method to be used for determining that structure in the general case will be given herebelow and examples of embodiment thereof will be given subsequently in the particular case of adjustable models of the first order, of the first order with a pure delay, and the second order.

The general method is as follows:

The adjustable model is chosen in the identification subassembly I in such a way that it demonstrates quite faithfully the dynamic reaction of the process to be controlled (for example, model of the first order with adjustable gain and time constant; or else, model of the second order with three adjustable coefficients, with idle time, etc.).

An analog, digital, hybrid, stochastic, etc., calculating structure which produces the adjustable model chosen, is selected.

For the requirements of the synthesis of the "regulator coefficients calculation" subassembly, the real process and the adjustable model chosen are taken for one another; it is therefore presumed that the regulator subassembly controls only a model and that the real process and the model are identical, this implying that the parameters of the process and of the model are identical: $a_0 = \hat{a}_0$, $a_1 = \hat{a}_1$, ... $a_i = \hat{a}_i$, ... $a_m = \hat{a}_m$; $b_0 = \hat{b}_0$, $b_1 = \hat{b}_1$, $b_i = \hat{b}_i$, ..., $b_n = \hat{b}_n$ and that the variables of state of the process and of the model are identical: $x_1 = \hat{x}_1$, ..., $x_i = \hat{x}_i$, ... $x_n = \hat{x}_n$.

If it is presumed, moreover, that all the parameters are constant (that is, that the model is no longer adjustable but has constant coefficients), the system thus obtained, called "reduced system" is a linear system having constant coefficients.

The transfer function of the reduced system, called $W_{red}$ (s), is calculated. The coefficients of the various terms in s of $W_{red}$ (s) are a function of the parameters $a_i = \hat{a}_i$ of the model and the coefficient $k_0, k_2, \ldots k_i \ldots k_n$ of the regulator.

The required reaction in a closed loop is demonstrated in the form of another transfer function $W_{ref}$ (s), having the same structure as $W_{red}$ (s) namely:

$$W_{ref}(s) = \frac{A_0 + A_1 s + A_2 s^2 + \ldots A_i s^i + \ldots A_m s^m}{B_0 + B_1 s + B_2 s^2 + \ldots B_i s^i + \ldots B_n s^n} \quad \text{(equ. 18)}$$

The coefficients of the increasing powers of s of $W_{ref}$ (s) and of $W_{red}$ (s) are identified expression by expression. N (n) algebraic equations which link the ($A_i$, $B_i$) symbols of $W_{ref}$(s), on the one hand, and the ($\hat{a}_i$, $\hat{b}_i$, $k_i$) symbols of $W_{red}$ (s) on the other hand are deduced therefrom.

By solving that system of algebraic equations obtained at the preceding phase, the algebraic relations which give the coefficients ki of the regulator as a function of the ($A_i$, $B_i$, $\hat{a}_i$, $\hat{b}_i$) symbols, that is, as a function of the required reaction in a closed loop (demonstrated by $A_i$, $B_i$) and of the estimated dynamic parameters ($\hat{a}_i$, $\hat{b}_i$) are deduced therefrom.

The algebraic relations obtained at the preceding phase in the form of analog, digital, hybrid, stochastic, etc., calculation circuits are demonstrated, effecting, if need be, simplifications.

The contents of the "regulator parameters calculation" subassembly is thus completely determined. Its complexity depends on the order of the model which has been chosen.

A self-adapting control element having an adjustable model of the first order will now be described, examining successively the "regulator" R, "identification" I and "calculation" C subassemblies and giving the overall performance of the control element. The subsystem R, shown in FIG. 6, has the function of calculating the magnitude of action 3 which is applied to the input of the process and of the adjustable model, starting from the following magnitudes: the input 1, the measurement (output of the process) 2, an estimated variable of state $\hat{x}_2$ supplied by the adjustable model of the first order and of the coefficients To and $k_2$ supplied by the subassembly C.

The input 1 may be calculated by an auxiliary circuit of the self-adapting control element (for example, a potentiometer supplied by the inside reference voltage of the device), or else it may come from the outside.

In this latter case, it may enter directly on the input subtractor (cascade regulating) or else it may enter on the input subtractor across an alternating potentiometer (cascade regulating with a proportional factor).

The subassembly R comprises the subtractor 8, a multiplier 29, the integrator 9 having an integration constant which may be monitored. The subtractor carries out the operation:

$$e = R - \Theta p - k_2 \hat{x}_2 \quad \text{(equl 9) (equ. 19)}$$

a formula in which: e is the signal provided by the subtractor 8, R is the input 1, $\theta p$ is the output of the process (measurement) 2, $\hat{x}_2$ is the second variable of state, estimated by the adjustable model and $k_2$ is the coefficient of the regulator.

The multiplier 29 carries out the multiplication of the estimated variable of state $\hat{x}_2$ coming from the identification subassembly I with the coefficient $k_2$ coming from the "regulator coefficients calculation" subassembly C.

The integrator 9 having an integration constant which may be monitored To carries out the following operation:

$$\rho(t) = \frac{1}{T_0} \int_0^t e(t) \, dt \quad \text{(equ. 20)}$$

The constant of integration To of that integrator is adjusted by a signal coming from the subassembly C; it represents the second adjustable coefficient of the subassembly R.

It is, more particularly, possible to provide the integrator 9 having an integration constant which may be monitored in the two following ways. In the first way, a conventional integrator having a fixed integration constant is precoded by a voltage dividing circuit whose voltage ratio is monitored by the signal To coming from the subassembly C. In the second way, a digital counting and reverse counting counter preceded by a ramp type voltage-to-frequency converter whose threshold voltage is monitored by the signal $T_o$ coming from the subassembly C is used. The digital counting and reverse counting counter is followed by a digital-to-analog converter.

Figure 7:
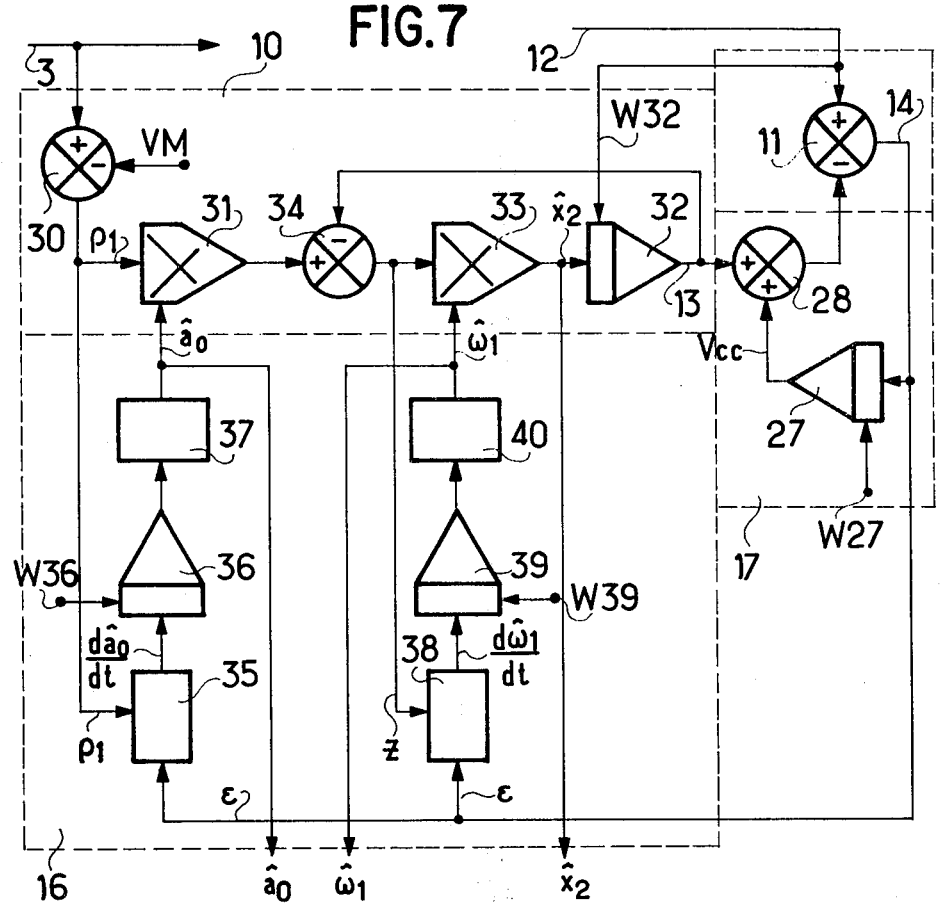

The identification subassembly I, which is shown in FIG. 7, has the function of determining, in real time, an estimate of the parameters which are, here: $\hat{a}_0$ (gain of the adjustable model) and $\hat{\omega}$ (cut = out pulse, equal to the reverse of the time constant $\hat{b}_1$ of the adjustable model) and an estimate of the second variable of state of the process, referenced $\hat{x}_2$.

The input signals are the action 3, equal to the input of the process and the measurement, equal to the output 2 of the process.

The subassembly is based on the principle of identification by a model and consists of the four parts already seen, adjustable model 10, comparator 11, adaptation mechanism, which comprises only the non-linear calculating block 16 in the particular case where the adjustable model is of the first order and compensation circuit 17 for the continuous component.

The adjustable model is described by the following relation:

Output of the adjustable model = M = P1

$$\Theta M = \rho_1 \frac{\hat{a}_0 \hat{\omega}_1}{\hat{\omega}_1 D} = \rho_1 \frac{\hat{a}_0}{1 + \hat{b}_1 D} \quad \text{(equ. 21)}$$

with the notations. $D = d/dt$ = differential operator in the distributive direction and $\rho_1$ = input signal of the model; it is connected to the action signal $p$ (input of the process) by the following relation:

$\rho_1 = \rho - VM$ (equ. 22)

Where VM represents a constant approximately equal to the average value of the action signal $\rho$.

The subtraction operation defined by the equation 22 and effected in a subtractor 30 makes it possible to improve, in certain cases, the rapidity of covergence and the precision of estimation of the parameter $\hat{a}_0$; it is not indispensable and the subtractor 30 can be left out.

The adjustable model consists of a multiplier 31 in series with a negative reaction chain comprising an integrator 32 and a multiplier 33, looping being affected on a subtractor 34.

The multiplier 31 effects the multiplying of the input signal in the adjustable model $\rho_1$ by the "gain $\hat{a}_0$" parameter.

The loop consisting of the multiplier 33 receiving the signal $\hat{\omega}1$ of the integrator 32 calculates the adjustable dynamic response expression $\hat{\omega}1/\omega_1+D$, so that the result obtained at the output of the adjustable model is $\rho_1 \hat{a}_0 \cdot \hat{\omega}1/\hat{\omega}_1+D$ That structure leads to the most simple producing of the regulator coefficients calculation subassembly C, but these operations may also be carried out in the reverse order. Firstly, passing the input signal of the adjustable model $\rho_1$ through the adjustable dynamic response loop; then multiplying that signal by the adjustable gain $\hat{a}_0$, this leading to an embodiment which is a little more complex, of the regulator coefficients calculation subassembly (an extra multiplying operation), but may have advantages in certain applications inasmuch as concerns the rapidity of convergence of the identification subsystem.

The comparator 11 carries out the subtraction between the output 2 of the process, on the one hand the output 13 of the model to which is added the continuous component $V_{cc}$ coming from the integrator 27, on the other hand.

The adaptation mechanism modifies the adjustable parameters $\hat{a}_0$ and $\hat{\omega}_1$ until the difference $\theta\delta$ between the output $\theta_p$ of the process 2 and the output $\theta_M$ of the adjustable model 13 be minimum.

In the particular case where the adjustable model is of the first order, the linear processing block of the adaptation mechanism such as defined previously is reduced to a simple gain, so that the adaptation mechanism no longer comprises anything other than the non-linear calculation block 16.

That non-linear calculation block receives, as input signals, the difference $\epsilon$ coming from 14, the comparator, the input signal $\rho_1$ of the adjustable model and a signal referenced Z, proportional to the derivative $d\theta M/dt$ of the output $\theta_M$ of the adjustable model:

$$Z = \chi \frac{d\Theta M}{dt}$$

The proportionality factor $\chi$ being equal to $T_2/\hat{\omega}_1$, where $T_2$ is the integration constant of the integrator 32 and $\hat{\omega}_1$ is the estimated parameter which comes into play as a multiplying factor in the multiplier 33.

The non-linear caluation block supplies as an output signal the estimated parameters $\hat{a}_0$ and $\hat{\omega}_1$ of the adjustable model, these signals being calculated as will now be explained.

The calculation chain for the parameter $\hat{a}_0$ consists of a circuit 35, an integrator 36 and a limiter 37.

The circuit 35, whose exact function will be specified further on, receives the signals $\rho_1$ (input of the adjustable model) and $\epsilon$ (difference between the output of the process and the output of the adjustable model). It sends out a signal referenced $d\hat{a}_0/dt$; that signal represents the variation of the parameter $\hat{a}_0$ and is integrated by the integrator 36 to give, at the output of the integrator, the parameter $\hat{a}_0$. By means of the limiter 37, it is possible to restrict to domain of variation of the parameter $\hat{a}_0$, so that $\hat{a}_{0\ lim\ min} \leq \hat{a}_0 \leq \hat{a}_{0\ lim\ max}$, with the restriction: $\hat{a}_{0\ lim\ min} > 0$. Indeed, that circuit must limit the excursion of $\hat{a}_0$ to a strictly positive domain, the value $\hat{a}_0=0$ not being admitted, for it gives rise to a stable state where the idenfication subassembly reamins blocked without being able to leave therefrom.

The chain for the calculation of the parameter $\omega_1$ comprises, likewise, a circuit 38, an integrator 39 and a limiter 40.

The circuit 38 (whose exact function will be specified further on) receives the signals Z and $\epsilon$ (difference between the output of the method and the output of the adjustable model); it sends out a signal referenced $d\hat{\omega}1/dt$; that signal represents the variation of the parameter $\hat{\omega}_1$ and is integrated by the integrator 39 to give, at the output of that integrator, the parameter $\hat{\omega}_1$.

By means of the limiter 40, the domain of variation of the parameter $\hat{\omega}_1$ may be restricted in such a way that $\hat{\omega}_{1\ lim\ min} \leq \hat{\omega}_1 \leq \hat{\omega}_{1\ lim\ max}$ where $\hat{\omega}_{1\ lim\ min} > 0$.

The circuits 35 and 38 may carry out various operations according to the possible variants of embodiment.

In a first variant, the circuit 35 carries out the operation:

$d\hat{a}_0/dt = \lambda_0 \cdot \rho_1 \cdot \epsilon$ (equ. 23) and the circuit 38 carries out the operation $$\frac{d\hat{\omega}_1}{dt} = \mu_1 \cdot Z \cdot \varepsilon \quad \text{(equ. 24).}$$

In a second variant, the circuit 35 carries out the operation: $d\hat{a}_0/dt = \lambda_0 \cdot \rho_1 \cdot Sgn^{\dot{}}(\epsilon)$(equ. 25) and the circuit 38 carries out the operation: $d\omega_1/dt = \mu_1 \cdot Z \cdot Sgn^{\dot{}}(\epsilon)$ (equ. 26).

In a third variant, the circuit 35 carries out the operation: $d\hat{a}_0/dt = \lambda_0 \cdot Sgn^{\dot{}}(\rho 1) \cdot \epsilon$ (equ. 27) and the circuit 38 carries out the operation: $d\omega_1/dt = \mu_1 \cdot Sgn^{\dot{}}(Z) \cdot \epsilon$ (equ. 28)

In a fourth variant, the circuit 35 carries out the operation: $d\hat{a}_0/dt = \lambda_0 \cdot Sgn^{\dot{}}(\rho_1) \cdot Sgn^{\dot{}}(\epsilon)$ (equ. 29) and the circuit 38 carries out the operation: $d\omega_1/dt = \mu_1 \cdot Sgn^{\dot{}}(Z) \cdot Sgn^{\dot{}}(\epsilon)$ (equ. 30).

The function symbol $Sgn^{\dot{}}$ which comes into play in the expressions (equation 23) to (equation 30) is that which has been defined previously with respect to equations 11 to 16; $\lambda_0$ and $\mu_1$ are positive or negative constants; physically, they represent the gains of the adapting loops of the model, which may be distributed among several distinct physical elements in a given embodiment.

The continuous compensation circuit is analogous to that which had already been seen with respect to FIG. 3.

Figure 8:
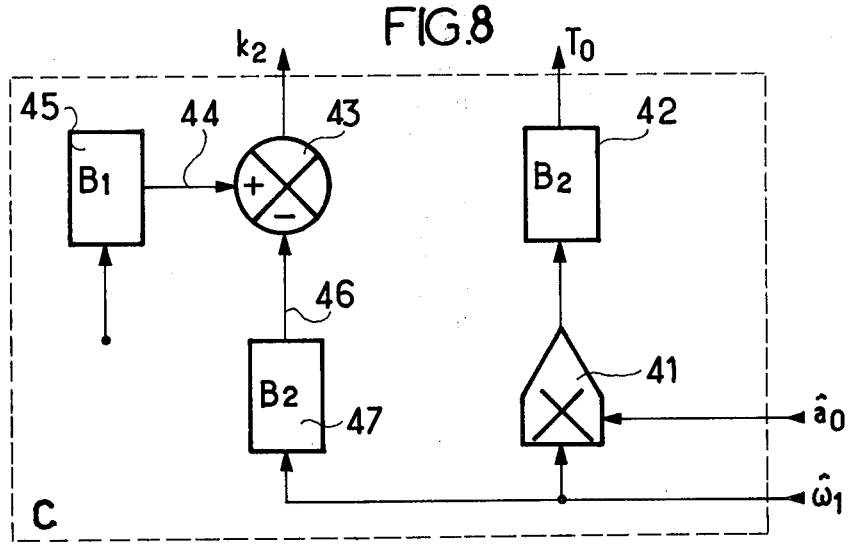

The regulator coefficients calculation subassembly, which is shown in FIG. 8, has the function of calculating the coefficients $T_0$ and $k_2$ of the regulator starting from the estimated parameters $\hat{a}_0$ and $\hat{\omega}_1$ provided by the idenfication subassembly I and data on the dynamic reaction which is required to be converred on the closed loop, this data being given in the implicit form of coefficients B1 and B2 of a transfer function of the second order, referenced W ref(s), which demonstrates the required dynamic reaction of the closed loop:

$$W_{ref}(s) = \frac{\text{output of the process}}{\text{input}} = \frac{\theta P}{R} = \frac{1}{1+B_1 s + B_2 s^2}$$

(equ. 31)

Applying the procedure described previously to determine the calculation subassembly, in the particular case where the adjustable model is of the first order, the following algebraic relations are obtained for the coefficients $T_3$ and $k_2$ of the of the regulator as a function of the estimated parameters ($\hat{a}_0$, $\hat{\omega}_1$) and of the data on the required dynamic reaction in a closed loop ($B_1$, $B_2$):

$T_0 = B_2 \cdot \hat{a}_0 \cdot \hat{\omega}_1$ (equ. 32)

$k_2 = B_1 - B_2 \cdot \hat{\omega}_1$ (equ. 33)

The calculation chain for the coefficient To comprises: a multiplier 41, which carries out the operation $\hat{a}_0 \cdot \hat{\omega}_1$ and an element 42 affecting that operation of the coefficient $B_2$, calculated by the user as a function of the dynamic reaction which it wishes to confer on the closed loop. In practice, the element 42 may be provided by a potentiometer, if need be, in combination with an amplifier.

The calculation chain for the coefficient $k_2$ comprises a subtractor circuit 43 having inputs: an input 44 fed by a constant $B_1$ calculated by the user as a function of the dynamic reaction which he wishes to confer on the closed loop and inserted in an element 45 which may be a potentiometer and the other input 46 fed by a signal representing the estimated parameter $\hat{\omega}_1$, weighted by the coefficient $B_2$ (the same as that defined above for the calculation chain for the coefficient $T_0$). The element 47 effecting that weighting may be a potentiometer.

Figure 9:
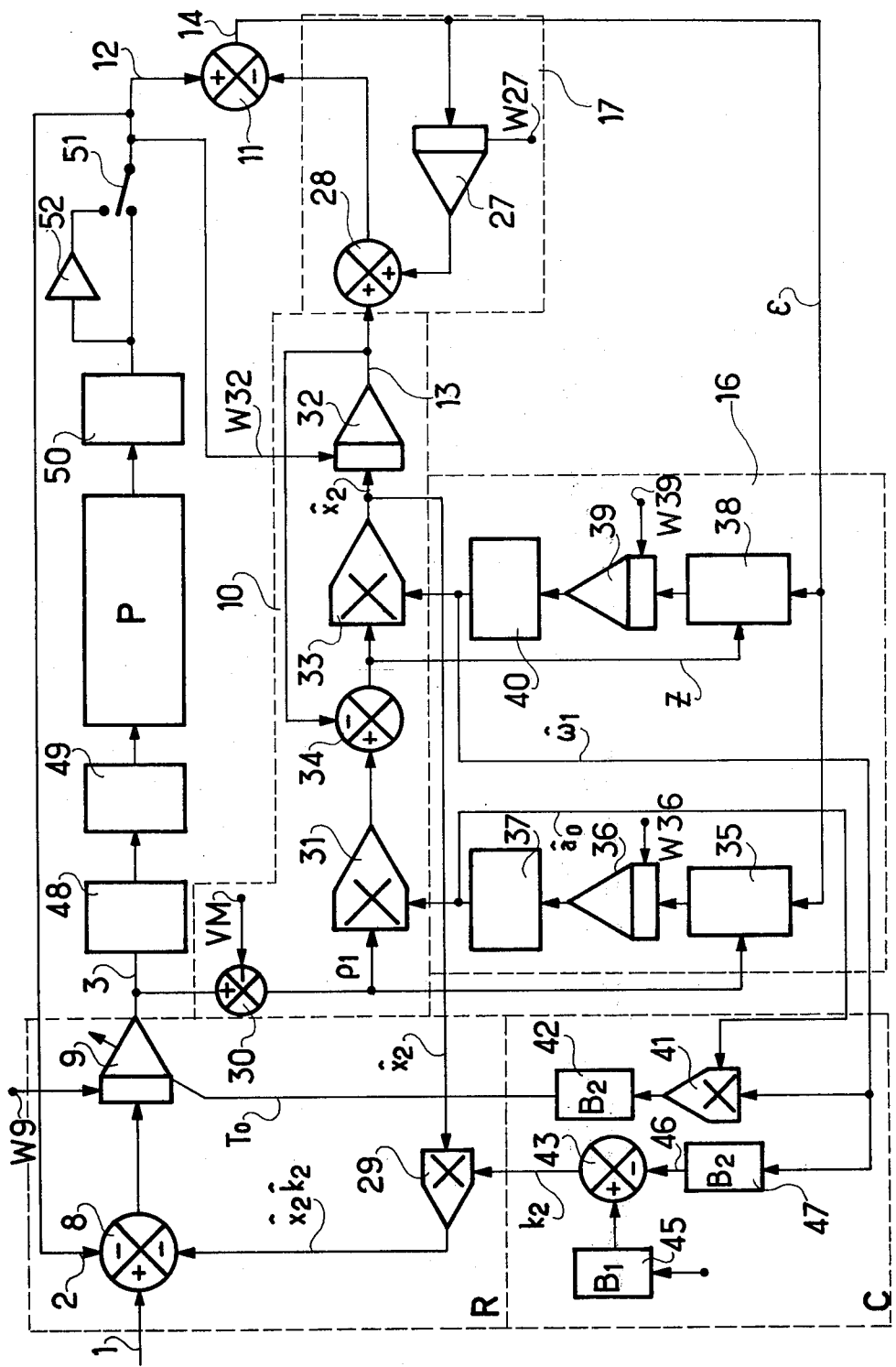

FIG. 9 shows the self-adapting control element assembly with an adjustable model of the first order. The various elements of FIGS. 6, 7, and 8 are shown again therein, as well as certain other elements fulfilling functions which will be specified.

The practical embodiment of that element may be provided indistinctly by means of analog calculation elements (electrical, pneumatic, fluidic or others); digital calculation elements; hybrid calculation elements (analog and digital combined); stochastic calculation elements; digital calculator, etc.

The action signal $p$ provided at 3 by the self-adapting control element may be limited in its excursion by a limiter 48 in such a way that:

$p$ lim min $\leq p \leq p$ lim max.

This may be important in certain regulating loops for safety reasons.

The slope $dp/dt$ of the action signal is automatically limited by the structure of the regulating subassembly; indeed, $p$ is the output signal of an integrator (q), so that this signal can never have an infinite slope in response to an input or disturbance level. The maximum slope $dp/dt$ of the action signal $p$ may be fixed by the user by means of the coefficients $B_1$ and $B_2$ which demonstrate the required dynamic reaction in the closed loop. This is an advantage of that self-adapting control element in relation to conventional regulators of the P or PI type, in applications where the variation speed of the control signal of the process must be limited for safety reasons.

Interface circuits 42 and 50 adapt the measurement signal (coming from the process) and the action signal (sent to the process) to the method of internal representation of the data which is used in the self-adapting control element: electric, pneumatic signals, etc., representing the data in analog, digital, hybrid, stochastic form, etc.

By means of a "direct-reverse" switch 51, a gain invertor circuit 52 may be added to the regulating loop, so as to be able to control processes which have an inversion in sign between their input and their output (that is, the processes whose output increases when the input decreases and vice-versa).

FIG. 9 does not show the supply means which feed the necessary energy to the various subsystems of the self-adapting control element.

The self-adapting control element has four methods of operation; the "manual" method; the "transfer" method; the "automatic non-adapting" method; and the "self-adapting" method.

These four methods of operation are defined by the states of the integrators 36, 39, 32, 27, 9.

Such integrators may assume three states: "original value", "memory" and "calculation".

The "original value" state (abbreviated to VI) in which the output s(t) of the integrator has the original value W.

The "memory" state (abbreviated to ME) in which the output $s(t)$ of the integrator retains in the memory the last value which it possessed in the "original value" state or in the "calculation" state.

The "calculation" state (abbreviated CL) in which the output $s(t)$ of the integrator is equal to the integral of the input, to which is added the original value:

$$s(t) = \frac{1}{T} \int_{t_o}^{t} e(t)\, dt + W(t_o)$$

The state of each integrator is controlled by auxiliary circuits which are not shown in the figures, for they are of conventional design.

The state of each integrator of the self-adapting control element is summarized in the table herebelow:

| Method of Operation | State of the Integrators | | | | |
|---|---|---|---|---|---|
| | 36 | 39 | 32 | 27 | 9 |
| Manual | VI | VI | VI | VI | VI |
| Transfer | VI | VI | CL | CL | VI |
| Automatic non-adapting | VI | VI | CL | CL | CL |
| Self-adapting | CL | CL | CL | CL | CL |

The "manual" method enables the user to monitor the process in an open loop. The control signal supplied at the input of the process is calculated simply by an adjustable source (for example, a potentiometer) and does not result from a calculation starting from the input, the measurement or data on the dynamic reaction of the process.

In the "manual" method, all the integrators are in the "original value" state; the control signal of the open loop process is supplied by the original value $W_9$ applied to the integrator 9 in the regulating subassembly. The integrator 32 receives, as an original value, the output signal of the process $\theta p$, so that the output of the model $\theta M$ (available at the output of the integrator 32) is equal to the output of the process. This enables time to be saved when passing from the "manual" method to the "transfer" method. The original value of the integrator 27 is at any value (zero, for example), but it will preferably be chosen such that the difference $\epsilon$ coming from the comparator be slight.

The original values $W_{36}$ and $W_{39}$ of the integrators 36 and 39 may have any value, but if the value of the parameters $a_0$ (gain) and $\omega_1$ (cut-out pulse equal to the reverse of the time constant) of the process are approximately known, the original values $W36$ and $W39$ may be adjusted to those values.

The "transfer" operation method has the effect of starting up the calculation circuits of the self-adapting control element, which was at rest in the "manual" method. The integrators 36 and 39 keep the "original value" state. The process reamins in an open loop. The action signal sent to the process continues to be supplied by the original value $W_9$ applied to the integrator 9. But the integrator 32 passes to the "calculation" state, so that the output of the adjustable model is no longer equal to the output of the process, but assumes a value which depends on the control signal of the process and on the parameters $\hat{a}_0$ and $\hat{\omega}_1$ of the adjustable model. The integrator 27 passes to the "calculations" state and calculates a voltage Vcc such that the average value of the difference $\epsilon$ coming from the comparator be zero.

In that method of operation, the identification subassembly operates as a nonadapting estimator. It estimates a variable of state $\hat{x}_2$ which is a function of the values of the parameters $\hat{a}_0$ and $\hat{\omega}_1$ displayed by means of the original values $W_{36}$ and $W_{39}$ on the integrators 36 anad 39; that estimated variable of state $\hat{x}2$ is different from the real variable of state $x_2$ of the process if the estimated parameters $\hat{a}_0$ and $\hat{\omega}_1$ do not coincide with the real parameters ao and $\omega_1$ of the process.

The "automatic nonadapting" operation method enables the self-adapting control element to be used as a conventional nonadapting regulator.

The integrator 9 passes to the "calculation" state, this having the effect of providing closed loop control of the process. The action signal $\rho$ calculated by the regulator subassembly R is a linear combination of the measurement, of the input and of the estimated variable of state $\hat{x}_2$, with coefficients To and $K_2$ themselves calculated by the regulator coefficients calculations subsystem C starting from the original values $W_{36}$ and $W_{39}$ of the parameters $\hat{a}_0$ and $\hat{\omega}_1$.

The integrators 36 and 39 remain in the "original value" state, this having the effect of maintaining the parameters $\hat{a}_0$ and $\hat{\omega}_1$ of the adjustable model blocked to their original values.

In this method of operation, the response of the process to a variation of the input or to a disturbance will be in compliance with the required dynamic reaction only if the estimated parameters $\hat{a}_0$ and $\hat{\omega}_1$ displayed by means of the original values $W_{36}$ and $W_{39}$ are equal to the real parameters ao and $\omega_1$ of the process. If this is not the case, or if the structure of the adjustable model selected does not enable the dynamic reaction of the process to be described with sufficient accuracy, a difference between the real reaction in a closed loop and the theoretical reference reaction will be observed.

The "self-adapting" operation method makes it possible to provide the adpating control of the process in a closed loop.

The integrators 36 and 39 pass to the "calculation" state, this having the effect of freeing the identification subassembly adapting mechanism. The latter automatically adjusts the parameters $\hat{a}_0$ and $\hat{\omega}_1$ of the adjustable model in such a way that they be as near as possible to the real values $a_0$ and $\omega_1$ of the parameters of the process.

On starting up the self-adapting control element on a regulating loop, a pass is made successively from the "manual" method to the "transfer" method, then to the "automatic non-adapting" method and lastly to the "self-adapting" method. The control of the methods of operation must be provided with a locking means which prevents the operator from passing directly from the "manual" method to the "automatic nonadapting" method or "self-adapting" method if it has not passed through the "transfer" method. For passes in the reverse direction, that locking is not necessary.

With reference to FIGS. 10, 11, and 12, a self-adapting control element having an adjustable model of the first order with a pure delay will be described.

FIG. 10 shows the regulating subassembly which has the function of calculating the magnitude of action $\rho$ which is applied to the input of the process and of the adjustable model, starting from the following magnitudes: the input 1, the measurement 2 (output of the process); the estimated variable of state $\hat{x}_2$ supplied by the adjustable model of the first order with a pure delay; the coefficients $T_0$ and $k_2$ supplied by the subassembly C; the nondelayed output $\theta_M(t)$ of the adjustable model and the delayed output $\theta_M(t-\bar{\tau})$ of the adjustable model.

As has already been seen, the input 1 may be calculated by an auxiliary circuit of the self-adapting control element.

The same elements as those in the subassembly R of the self-adapting control element having an adjustable model of the first order are also mounted in the subassembly R; subtractor 8, multiplier 29, and integrator 9 having a constant of integration which may be monitored.

The subtractor carries out the operation: $e = R - \theta M(t) - k2\,\hat{x}2 + \theta M(t - \bar{\tau}) - \theta\,p(t - \tau)$ (equ. 34)

With the notations e = signal supplied by the subtractor; R=input; $\theta_M(t)$=nondelayed output of the adjustable model; $\theta_M(t-\bar{\tau})$=delayed output of the adjustable model; $\theta_p(t-\tau)$=output of the process (measurement); $\hat{x}_2$=second variable of state estimated by the adjustable model and $k_2$=coefficient of the regulator.

The multiplier 29 carries out the multiplication of the estimated variable of state $\hat{x}_2$ coming from the identification subassembly I, by the coefficient $k_2$ coming from the "regulator coefficients calculation" subassembly C.

The integrator 9 having constant of integration which may be monitored carries out the following operation:

$$\rho(t) = \frac{1}{T} \int_0^t e(t)\,dt \quad \text{(equ. 35)}$$

The constant of integration $T_0$ of that integrator is adjusted by a signal coming from the subassembly C. It represents the second adjustable coefficient of the subassembly R.

Possible embodiments of the integrator having a constant of integration 9 which may be monitored have already been given with the example relating to the case of an adjustable model of the first order.

FIG. 11 shows the identification subassembly I in the case where the adjustable model is of the first order with a pure delay.

That identification subassembly I has the function of determining in real time an estimate of the parameters $\hat{a}_0$ (gain) and $\hat{\omega}_1$ (cut-out pulse, equal to the reverse of the time constant $\hat{b}_1$); an estimate of the second variable in state of the process, referenced $\hat{x}_2$ and an estimate of the nondelayed output of the process (nondelayed output of the adjustable model, referenced $\theta_M(t)$; and an estimate of the output of the process (delayed output of the process, referenced $\theta_M(t-\tau)$.

The input signals are the action 3, equal to the input of the process and the measurement 2, equal to the output of the process.

That subassembly is based on the principle of identification by an adjustable model and consists, like the subassembly in FIG. 7, of four parts: the adjustable model 10, the comparator 11; the adapting mechanism, which comprises only the non-linear calculation block 16 and the circuit 17 for compensating the continuous component.

The adjustable model 10 is constituted by a multiplier 31 followed by a negative reaction chain constituted by a multiplier 33 and an integrator 32, that chain itself being followed by a device 53 having a pure delay $\bar{\tau}$.

The adjustable model reproduces an input-output relation of the first order with three parameters, which are: the adjustable gain $\hat{a}_0$; the adjustable cut-out pulse $\hat{\omega}_1$; and the pure delay $\bar{\tau}$ of the adjustable model.

The adjustable model is described by the following relation between its input P1 and its output $\theta$M.

$$M(t-\bar{\tau}) = p_1(t-\bar{\tau}) \cdot \frac{\hat{a}_0 \hat{\omega}_1}{\hat{\omega}_1 + D} = p_1(t-\tau) \cdot \frac{\hat{a}_0}{1+\hat{b}_1 D} \quad \text{(equ. 36)}$$

with the notations:

D = d/dt = differential operator in the distributive direction and $p_1$=input sinal of the model linked to the action signal $\rho$ (input of the process) by the following relation:

$$\rho 1 = \rho - VM$$

(equ. 22)

where VM represents a time constant approximately equal to the average value of the action signal $\rho$. That subtraction operation is carried out in the subtractor 30, but it is not indispensable.

The pure delay $\bar{\tau}$ of the adjustable model may be displayed manually by an operator, based on the approximate knowledge of the pure delay $\tau$ of the process, or else it may be monitored by an outside signal (in the case where the delay varies with a measurable magnitude of the process, a discharge, for example).

The comparator 11 effects the subtraction between the output of the process $\theta_p(t-\tau)$ on the one hand and the delayed output of the model $\theta_M(t-\bar{\tau})$ to which is added the continuous component Vcc coming from the integrator 27, on the other hand.

The adapting mechanism modifies the adjustable parameters $\hat{a}_0$ and $\hat{\omega}_1$ until the difference $\epsilon$ between output $\theta_p(t-\tau)$ of the process and the output $\theta_M(t-\bar{\tau})$ of the adjustable model be minimum.

The non-linear calculating block 16 receives, as input signals: the difference $\epsilon$ coming from the comparator 11; the delayed output signal of the adjustable model $\theta_M(t-\bar{\tau})$ and a signal referenced y which represents an approximation of the derivative $d\theta_M(t-\bar{\tau})/dt$ of the delayed output $\theta_M(t-\bar{\tau})$ of the adjustable model. The signal y is obtained by making the signal $\theta_M(t-\bar{\tau})$ pass through a high-pass filter 54 consisting of an integrator 55 and a subtractor 56. The constant of integration of the integrator 55 must be chosen so that the high-pass filter supply a good approximation of $d\theta_M(t-\bar{\tau})/dt$.

The non-linear calculating block 16 supplies, as output signals the estimated parameters $\hat{a}_0$ and $\hat{\omega}_1$ of the adjustable model, calculated in circuits similar to those already seen in the case of the model of the first order: 35, 36, 37 and 38, 39, 40 and to which the various variants given then are also applied. The difference with the diagram in FIG. 7 is that the circuit 35 receives the signal $\theta_M(t-\bar{\tau})$ instead of the signal $p_1$ and that the circuit 38 receives the signal y instead of the signal Z.

The same circuit 17 as previously used for the compensation of the continuous component is found again.

The regulator coefficients calculation subassembly in the case where the adjustable model is of the first order with a pure delay is identical to that described with reference to FIG. 8. It has the function of calculating the coefficients To and $k_2$ of the regulator, starting from: the estimated parameters $\hat{a}_0$ and $\hat{\omega}_1$ supplied by the identification subassembly I and data on the dynamic reaction which is required to be conferred on the closed loop. This data is given in the implicit form of the coefficients B1 and B2 of a transfer function of the second order referenced $W_{ref}(s)$ which demonstrates the required dynamic reaction of the closed loop.

$$W_{ref}(s) = \frac{\text{output of the process}}{\text{input}} = \frac{\theta_p}{R} = \frac{e-\tau s}{1+B_1 s+B_2 s^2}$$

(equ. 37)

By applying the procedure set forth previously for determining the structure of the calculation subassembly, the algebraic relations referenced equation 32 and equation 33 for the coefficients $T_o$ and $k_2$ of the regulator as a function of the estimated parameters ($\hat{a}_0$, $\hat{\omega}_1$) and data on the required dynamic reaction in a closed loop ($B_1$, $B_2$) are obtained. The structure thus consists of the same elements as those in FIG. 8.

FIG. 12 shows the general diagram of the self-adapting control element having an adjustable model of the first order with a pure delay. That diagram differs from that in FIG. 9 on the following points:

The output signal $\theta_M(t)$ of the adjustable model is shifted in time by a quantity $\bar{\tau}$ by a circuit 53 which produces a pure delay;

The adjustment law for the parameter $\hat{a}_0$ is modified;

The adjustment law for the parameter $\hat{\omega}_1$ is modified;

An auxiliary circuit 54 in the adapting mechanism for calculating the approximate derivation of the delayed output $\theta_M(t-\bar{\tau})$ of the adjustable model is brought in.

There are extra input signals in the regulating subassembly.

Figure 13:
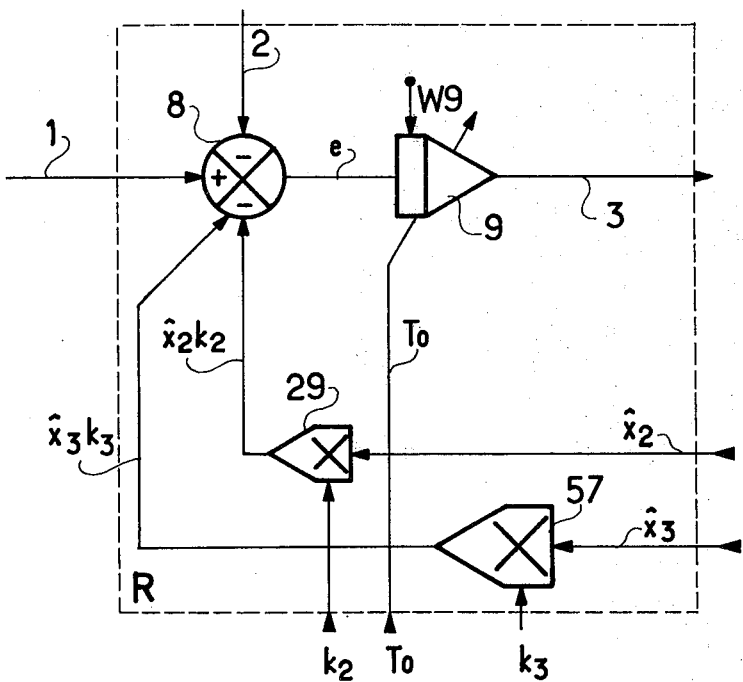

FIG. 13 represents the "regulating" subassembly R in the case where the adjustable model is of the second order.

The subassembly R has the function of calculating the magnitude of action 3 which is applied to the input of the process and of the adjustable model, starting from the following magnitudes: the input 1, the measurement 2 (output of the process), the estimated variables of state $\hat{x}_2$ and $\hat{x}_3$ supplied by the adjustable model of the second order and the coefficients $T_o$, $k_2$ and $k_3$ supplied by the subassembly C.

The input 1 may, as has previously been seen, be calculated by an auxiliary circuit of the self-adapting control element or come from the outside.

The subassembly R consists of the subtractor 8, the multiplier 29, a second multiplier 57 and the integrator 9 having a constant of integration which may be monitored.

The subtractor carries out the operation: $e = R - \theta_p - k_2 \hat{x}_2 - k_3 \hat{x}_3$ (equ. 38)

with the notes: $e$=signal sent out by the subtractor 8; R=input; $\theta_p$=output of the process (measurement); $\hat{x}_2$=second variable of state, estimated by the adjustable model; and $k_2$ and $k_3$=coefficients of the regulator given by the calculation subassembly.

The multiplier 29 carries out the multiplication of the estimated variable of state $\hat{x}_2$ coming from the identification subassembly I with the coefficient $k_2$ coming from the (regulator coefficients calculation) subassembly C.

The multiplier 57 carries out the multiplication of the estimated variable of state $\hat{x}_3$ coming from the identification subassembly I with the coefficient $k_3$ coming from the regulator coefficients calculation subassembly.

The integrator 9 which has a constant of integration which may be monitored carries out the following operation:

$$\rho(t) = \frac{1}{T_o} \int_0^t e(t)\,dt \quad (\text{equ. 20})$$

The constant of integration $T_o$ of that integrator is adjusted by a signal coming from the subassembly C. It represents the third adjustable coefficient of the subassembly R.

FIG. 14 shows the identification subassembly I in the case where the adjustable model is of the second order, that is, comprises two adjustable poles.

That identification subassembly I has the function of determining, in real time, an estimate of the parameters $\hat{a}_o$ (gain) and $\hat{\omega}_1$ (cut-out pulse, equal to the reverse of the time constant $\hat{b}_1$); an estimate of the second variable of state of the process, referenced $\hat{x}_2$, an estimate of the third variable in state of the process, referenced $\hat{x}_3$.

The input signals are the action 3, equal to the input of the process and the measurement 2, equal to the output of the process.

The output signals are the estimated gain $\hat{a}_o$; the estimated cut-out pulse $\hat{\omega}_1$, of the first real pole of the adjustable model; the estimated variable of state $\hat{x}_2$; the estimated variable of state $\hat{x}_3$; and the recopying of the value of the pulse $\tilde{\omega}_2$ of the second real pole of the adjustable model; in the example illustrated, that pulse $\tilde{\omega}_2$ is displayed by the operator in the adjustable model by affecting the coefficient 58.

That subassembly I is based on the principal of identification by an adjustable model and consists of four parts: the adjustable model 10; the comparator 11; the adapting mechanism, which comprises only the non-linear calculation block 16; and the circuit 17 for compensating the continuous component.

The adjustable model 10 reproduces an input-output relation of the second order with three parameters, which are the adjustable gain $\hat{a}_o$, the adjustable cut-out pulse $\hat{\omega}_1$, where $\hat{\omega}_1 = 1/\hat{b}_1 b$; the displayed cut-out pulse $\tilde{\omega}_2$ where $\tilde{\omega}_2 = 1/\tilde{b}_2$, $\tilde{b}_1$ and $\tilde{b}_2$ being time constants of the process of the second order.

The adjustable model is described by the following relation between the output $\theta M$ of the adjustable model and the input signal $\rho_1$ of the model:

$$\Theta_M = \frac{\rho_1 \hat{a}_o \hat{\omega}_1 \tilde{\omega}_2}{(\hat{\omega}_1 + D)(\tilde{\omega}_2 + D)} = \rho_1 \frac{\hat{a}_o}{(a + \hat{b}_1 D)(1 + \tilde{b}_2 D)} \quad (\text{equ. 38})$$

a relation in which $d = d/dt$ is the differential operator in the distributive direction and $\rho_1$ is linked to the action signal $\rho$ (input of the process), as has already been seen, by the relation previously referenced equation 22. There, too, the subtractor could be removed.

The adjustable model consists of a multiplier 31, followed, in series, by a first negative reaction chain constituted by a device 58 bringing in a coefficient $\tilde{\omega}_2$ 2 and an integrator 59 looped on a subtractor 60 and by a second negative reaction chain constituted by a multiplier 33, receiving the pulse $\hat{\omega}_1$, and by an integrator 32.

The pulse $\tilde{\omega}_2$ of the adjustable model may be displayed manually at 58 by an operator, starting from the exact or approximate knowledge of the pulse $\omega_2$ of the process (physically, it corresponds to the reverse of the second time constant $b_2$ of a process of the second order) or else it may be piloted by an outside signal in the case where that pulse varies with a measurable magnitude of the process. A connection 62 signifies that the pulse $\tilde{\omega}_2$ has been recopied in the device 61.

The comparator effects the subtraction between the output of the process $\theta_p$ on the one hand and the output of the model to which is added the continuous component Vcc coming from the integrator 27 on the other hand.

The adaptation mechanism modifies the adjustable parameters $\hat{a}_o$ and $\hat{\omega}_1$ until the difference $\epsilon$ between the output $\theta_p$ of the process and the output $\theta_M$ of the adjustable model be minimum.

In the particular case where the adjustable model is of the second order with a single self-adjustable real pole (the second real pole being displayed and not self-adjustable), the linear processing block of the adapting mechanism, defined previously, is reduced to a simple gain, so that the adapting mechanism now comprise only the non-linear calculating block 16.

That non-linear calculating block 16 receives as an input signal the difference $\epsilon$ coming from the comparator, the input signal $\rho_1$ of the adjustable model, a signal referenced Z, proportional to the derivative $d\theta_M/dt$ of the output $\theta_M$ of the adjustable model: $Z = X\,d\theta_M/dt$ The proportionality factor X being equal to $T_2/\hat{\omega}_1$, where $T_2$ is the constant of integration of the integrator 32 and $\hat{\omega}_1$ is the estimated parameter which comes into play as a multiplying factor in the multiplier 33.

The non-linear calculating block supplies, as output signals the estimated parameters $\hat{a}_o$ and $\hat{\omega}_1$ of the adjustable model. These signals are calculated as described previously with reference to FIG. 7.

As a second variable of state $x_2$, the estimated variable of state $\hat{x}_2$ sampled at the input of the integrator 32 is used as a third variable of state $x_3$, the estimated variable of state $\hat{x}_3$ sampled at the input of the integrator 59 is used.

The circuit 17 for the compensation of the continuous component is also that which has been seen previously.

The regulator coefficients calculation subassembly has the function of calculating the coefficients $T_o$, $k_2$, $k_3$ of the regulator, starting from the estimated parameters $\hat{a}_o$ and $\hat{\omega}_1$ provided by the identification subassembly I and from the value of the parameter $\hat{\omega}_2$ provided by a recopying device 61 in the identification subassembly I and from data on the dynamic reaction which is required to be conferred on the closed loop, this data being given in the implicit form of the coefficients $B_1$, $B_2$, $B_3$ of a transfer function of the 3rd order, referenced $W_{ref}$ (s) which demonstrates the required dynamic reaction of the closed loop:

$$W_{ref}(s) = \frac{\text{output of the process}}{\text{input}} = \frac{\theta_p}{R} = \frac{1}{1+B_1 s+B_2 s^2+B_3 s^3}$$

(equ. 39)

Figure 15:
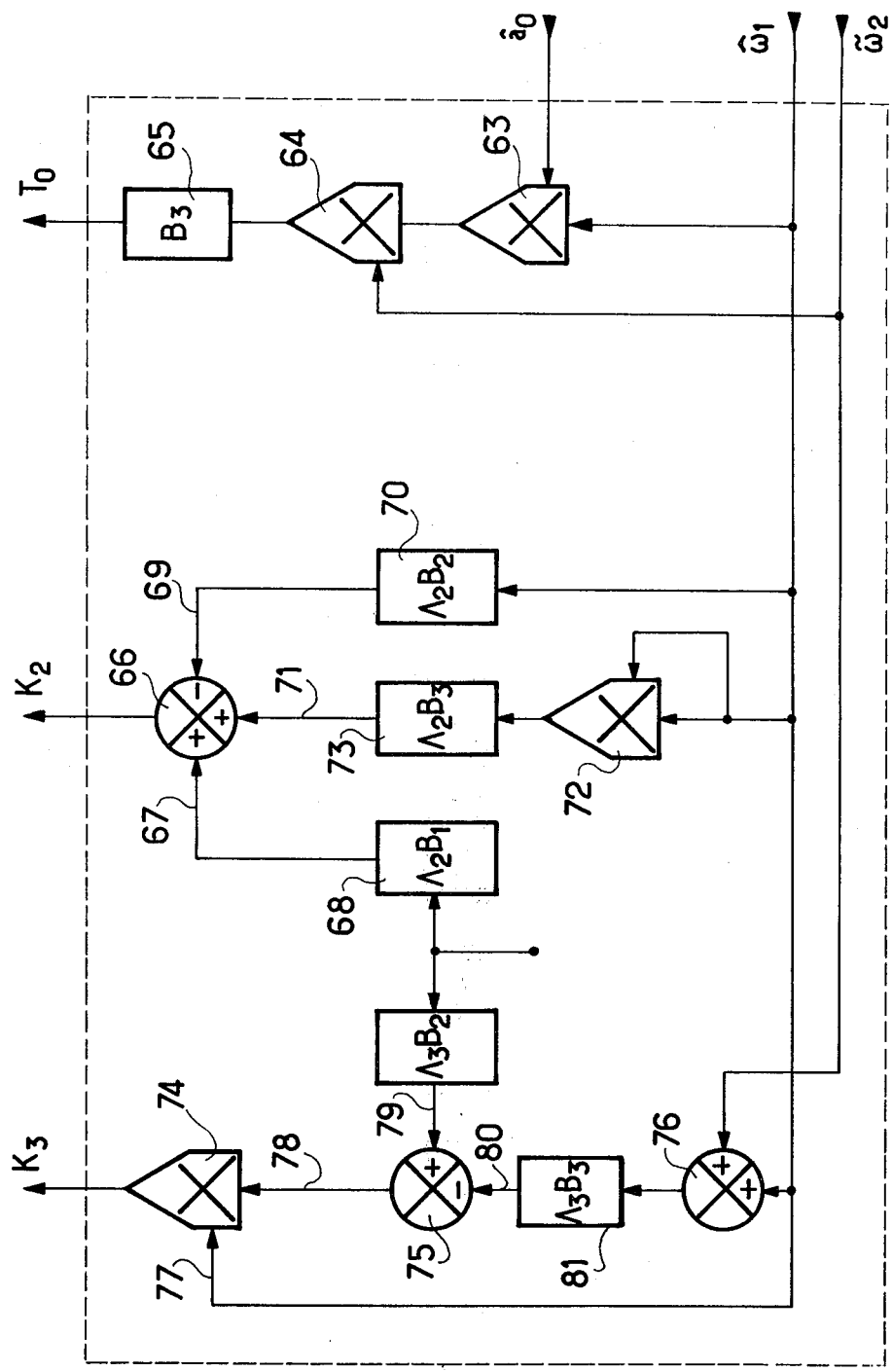

The structure of the subassembly C in the case where the adjustable model is of the second order is shown in FIG. 15.

By applying the general method for determining the structure of that subassembly, in the particular case of an adjustable model of the second order such as defined with reference to FIG. 14, the following algebraic relations are obtained for the coefficients $T_o$, $k_2$ and $k_3$ of the regulator as a function of the parameters ($\hat{a}_o$, $\hat{\omega}_1$, $\hat{\omega}_2$) provided by the identification subassembly and of the data on the required dynamic reaction in a closed loop ($B_1$, $B_2$, $B_3$):

$$T_o = \hat{a}_o \cdot \hat{\omega}_1 \cdot \hat{\omega}_2 \cdot B_3 \text{ (equ. 40)}$$

$$k_2 = \Lambda_2 (B_1 - B_2 \hat{\omega}_1 + B_3 \hat{\omega}_1 2) \text{ (equ. 41)}$$

$$k_3 = \Lambda_3 \hat{\omega}_1(B_2 - B_3 (\hat{\omega}_1+ \hat{\omega}_2)) \text{ (equ. 42)}$$

In these relations $\Lambda_2$ and $\Lambda_3$ are coefficients which depend on the framing factors proper to the calculation elements used in the subassemblies I, C and R.

The calculation chain for the coefficient $T_o$ comprises a multiplier 63 which carries out the operation $\hat{a}_o \cdot \hat{\omega}_1$, a multiplier 64 which carries out the operation ($\hat{a}_o \cdot \hat{\omega}_1$) $\hat{\omega}_2$ and a device 65 which affects the result of that operation with the coefficient $B_3$.

The coefficient $B_3$ is calculated by the user as a function of the dynamic reaction which he wishes to confer on the closed loop and is displayed in the subassembly C.

The chain for calculating the coefficient $k_2$ comprises a subtractor circuit 66 having three inputs: a positive input 67 is supplied by a constant $\Lambda_2 B_1$ brought in by 68, starting from a constant internal reference and calculated by the user as a function of the required dynamic reaction in a closed loop and of the framing coefficients proper to the calculation elements used in the subassemblies I, C and R; a negative input 69 is fed by the signal representing the estimated parameter $\hat{\omega}_1$, weighted at 70 by a coefficient $\Lambda_2 B_2$ calculated by the user as a function of the same characteristics as those determining the constant $\Lambda_2 B_1$; a positive input 71 is fed by the signal representing the estimated parameter $\hat{\omega}_1$ raised to the square by means of a multiplier 72 and weighted at 73 by a coefficient $\Lambda_2 B_3$ calculated by the user as a function of the same characteristics as those determining $\Lambda_2 B_1$ and $\Lambda_2 B_2$.

The calculation chain for the coefficient $k_3$ comprises a multiplier 74, a subtractor circuit 75 and an adder circuit 76.

The multiplier 74 receives, on an input 77, the signal representing the estimated parameter $\hat{\omega}_{1a}$ and, on the other input 78, the output signal of the subtractor 75. The positive input 79 of that subtractor 75 is fed by a constant $\Lambda_3 B_2$. The negative input 80 of that subtractor is fed by the output signal coming from the adder 76, weighted at 81 by a coefficient $\Lambda_3 B_3$. One input of the adder receives the signal representing the parameter $\hat{\omega}_1$; the other input receives the signal for recopying the parameter $\hat{\omega}_2$ coming from 61.

Figure 16:
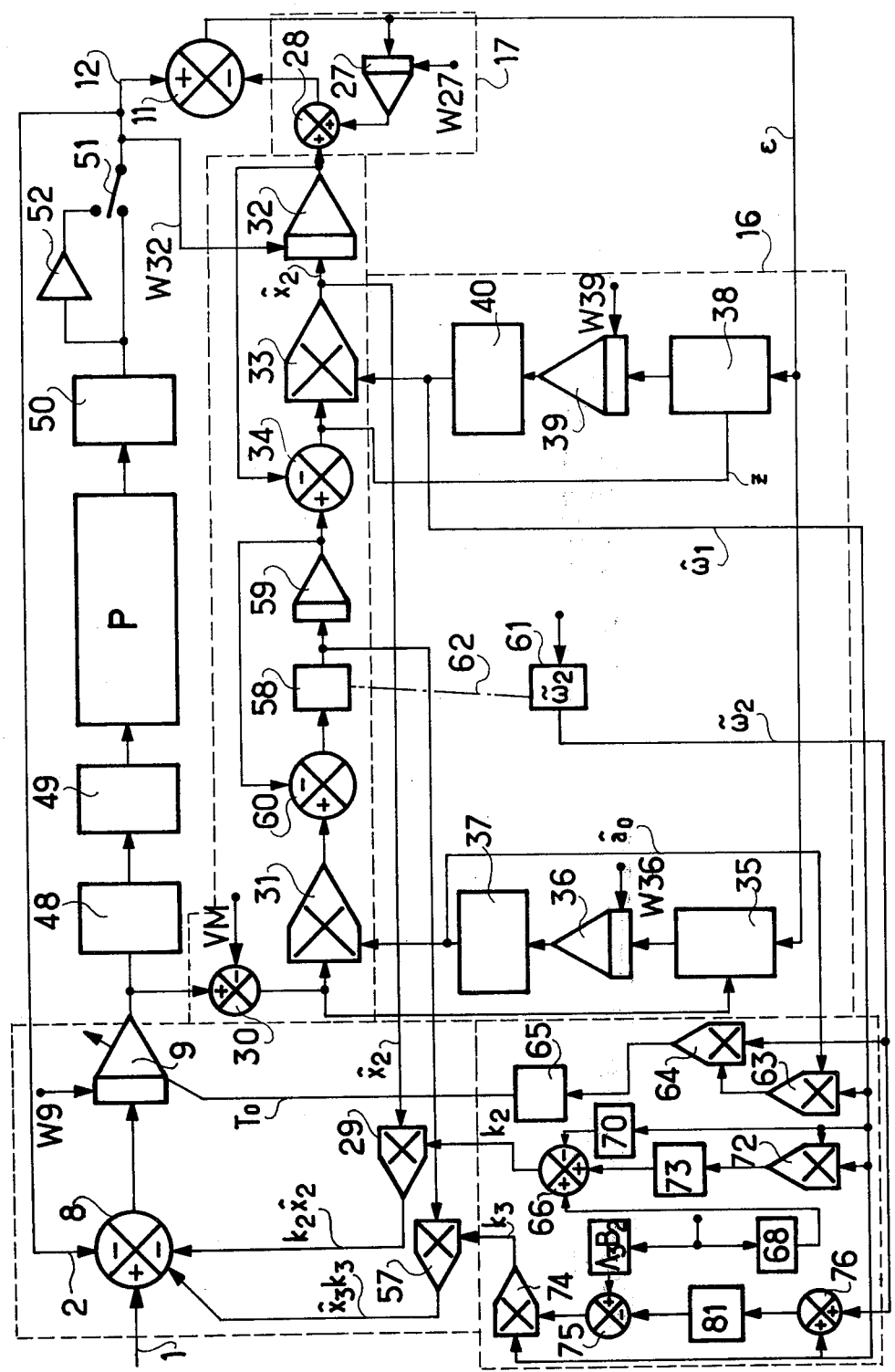

FIG. 16 shows the self-adapting control element assembly having an adjustable model of the second order, in which the elements in FIGS. 13, 14, and 15 are installed, as well as the elements fulfilling certain auxiliary functions already set forth with reference to FIG. 9.

That structure distinguishes itself from that which has been described for an adjustable model of the first order by the following elements.

The adjustable model in the identification subassembly contains a real second pole for a transfer function $\tilde{\omega}2/\tilde{\omega}_2$ ++ inserted between the self-adjustable gain $\hat{a}_o$ and the loop which calculates the first real self-adjustable pole for a transfer function $\hat{\omega}_1/\hat{\omega}_1 + s$;

The regulating subassembly receives an extra signal $\hat{x}_3 k_3$ coming from the adjustable model;

The structure of the regulator coefficient calculation assembly is modified.

The regulator subassembly contains an extra adjustable coefficient referenced $k_3$.

The functions necessary for producing the self-adapting control element, having an adjustable of the second order may be implemented, as in the case of an adjustable model of the first order indistinctly by means of analog calculating elements (electrical, pneumatic, fluidic or others), of digital calculating elements, of hybrid calculating elements (analog and digital combined), of stochastic calculating elements, of a digital calculator, etc.

What is claimed is:

1. Self-adapting control element for processes whose parameters are unknown or variable, comprising regulator means for regulating the variables of states of a process having adjustable coefficients, which receives a signal input value corresponding to variables representative of the state of the process and supplies a control signal for controlling the process; first sub-assembly means responsive to the input and output of the process for the identification of the parameters thereof and for detecting the variations in the states of the process, said first sub-assembly means being constituted by a model having adjustable parameters, placed in parallel with the process, and by adapting means for modifying the parameters of the model until the difference between the outputs of process and of the model is a minimum; and second sub-assembly means for controlling the coefficients of the regulator in accordance with the parameters of the model and data on the required performance of the process.

2. Self-adapting control element according to claim 1, wherein said adjustable model is of the first order, characterized in that said regulator means comprises a subtractor receiving, on a positive input, an input signal for control of the porcess and, on respective negative inputs, a signal from the output of the process and a variable signal coming from said model, a multiplier connected to the output of said subtractor and to an integrator having a constant of integration which may be controlled, receiving the output of the subtractor and supplying said control signal to the process, the multiplication coefficient of said multiplier and the constant of integration of said integration being controlled from said second subassembly means.

3. Self-adapting control element according to claim 2, in which the adjustable model consists of a first multiplier providing a first parameter followed by a negative reaction chain constituted by a second multiplier providing a second parameter connected to an integrator, characterized in that said adapting means comprises first means for multiplying by a constant of the product of the signal representing the difference between the output of the model and the output of the process, by the input signal in the model, and a first integrator whose input is connected to the output of the said first means and whose output is connected to the first multiplier of the model to insert therein the first parameter.

4. Self-adapting control element according to claim 3, characterized in that said adapting means further comprises second means for multiplying by a constant of the product of the signal representing the difference between the output of the model and the output of the process, by the signal sampled at the input of the second multiplier of the model, and a second integrator whose input is connected to the output of the said second device and whose output is connected to the second multiplier of the model to insert the second parameter therein.

5. Self-adapting control element according to claim 3, characterized in that said second sub-assembly means comprises a second multiplier receiving first and second parameter signals and being connected to an element which affects the output of said second multiplier with a coefficient given by the data on the required performance and from whose output the constant of integration of the multiplier in the adjustable model is obtained.

6. Self-adapting control element according to claim 5, characterized in that the second sub-assembly means further comprises a subtractor at whose output the coefficient of the multiplier in said model is obtained and at whose input signal is received representing a constant given by the data on the performance required along with a second parameter signal.

7. Self-adapting control element according to claim 1, in which the adjustable model is of the first order having a pure delay, characterized in that said regulator means comprises a subtractor receiving an input signal on a positive input, and the delayed output of the model on one negative input, a measurement signal which is the output of the process and a variable signal corresponding to the state of the model being applied to a second negative input via a multiplier, a non-delayed output of the model being applied to a third negative input of said subtractor, and an integrator having a constant of integration which may be controlled receiving the output of the subtractor and supplying said control signal to said process, the coefficient of multiplication of the multiplier and the constant of integration of the integrator being derived from said second sub-assembly.

8. Self-adapting control element according to claim 7, characterized in that the model having adjustable parameters consists of a first multiplier providing a first parameter connected to a negative reaction chain constituted by a second multiplier providing a second parameter and by an integrator, that chain itself being connected in series with an element having a pure delay.

9. Self-adapting control element according to claim 8, characterized in that said adapting means comprises first means for multiplying by a constant of the product of the signal representing the difference between the output of the model and the output of the process, by the non-delayed output signal of the model, it being possible to replace one or both of these two signals by its symbol, and an integrator whose input is connected to the output of the said first means and whose output is connected to the first multiplier of the model to insert therein the first parameter.

10. Self-adapting control element according to claim 9, characterized in that said adapting means comprises second means for multiplying by a constant of the product of the signal representing the difference between the output of the model and the output of the process by a signal which is the approximate derivative of the delayed output of the model, it being possible for one or both of these two signals to be replaced by its symbol, and an integrator whose input is connected to the output of the said second means and whose output is connected to the second multiplier of the model to insert therein the second parameter.

11. Self-adapting control element according to claim 10, characterized in that said second sub-assembly means comprises a multiplier receiving the first and second parameters connected to an element which controls the output of that multiplier in accordance with a coefficient given by the data on the required performance and at whose output the constant of integration of the integrator of said model is obtained.

12. Self-adapting control element according to claim 11, characterized in that said second sub-assembly means further comprises a subtractor at whose output the coefficient of the multiplier of said model is obtained and at whose input a constant given by the data on the required performance and the second parameter are received.

13. Self-adapting control element according to claim 1, in which the adjustable model is of the second order, characterized in that said regulator means comprises a subtractor receiving, on a positive input, an input signal and, on respective negative inputs, a measurement which is the output of the process, a first variable coming from the mode, affected by a first coefficient in a multiplier and a second variable coming from the model affected by a second coefficient in a multiplier and an integrator having a constant of integration which may be controlled, receiving the output of the subtractor and providing said control signal and in that said first and second multiplication coefficients and said constant of integration are derived from said second sub-assembly means.

14. Self-adapting control element according to claim 13, characterized in that the model having adjustable parameters consists of a first multiplier providing a first parameter followed, in series, by a first negative reaction chain constituted by means for bringing in a second parameter in the form of a coefficient and by an integrator, and by a second negative reaction chain constituted by a second multiplier providing a third parameter and by an integrator.

15. Self-adapting control element according to claim 14, characterized in that said adapting means comprises first means for multiplying by a constant of the product of the signal showing the difference between the output of the model and the output of the process, by the input signal in the model, it being possible for one or both of these two signals to be replaced by its symbol, and an integrator whose input is connected to the output of the said first means and whose output is connected to the first multiplier of the model to insert therein the first parameter.

16. Self-adapting control element according to claim 15, characterized in that said adapting means comprises second means for multiplying by a constant of the product of the signal showing the difference between the output of the model and the output of the process by the signal sampled at the input of the second multiplier of the model, it being possible to replace one or both of these two signals by its symbol, and an integrator whose input is connected to the output of the said second means and whose output is connected to the second multiplier of the model to insert therein the third parameter.

17. Self-adapting control element according to claim 16, characterized in that said second sub-assembly means comprises two multipliers in series, the first of these multipliers receiving the first and third parameters and the second of these multipliers receiving, besides the output of said first multiplier, the second parameter and having its output connected to an element which controls it in accordance with a coefficient given by the data on the required performances and at whose output the constant of integration of the integrator in said model is obtained.

18. Self-adapting control element according to claim 16, characterized in that said second sub-assembly means comprises a subtractor, at whose output first coefficient of the multiplier in said model is obtained, at positive inputs of which a constant given by the data on the required performance and the third parameter raised to the square and controlled by a coefficient given by the data on the required performance arrive and at whose negative input the third parameter controlled by a coefficient given by the data on the required performance arrives.

19. Self-adapting control element according to claim 16, characterized in that said second sub-assembly means comprises a multiplier at whose output the second coefficient of the multiplier in said model is obtained and which receives at the input the third parameter and the output of a subtractor receiving, at the input, a constant corresponding to the data on the required performances and a signal which is the sum of the second and third parameters.

* * * * *